United States Patent
Smyth et al.

(10) Patent No.: US 10,698,917 B2
(45) Date of Patent: Jun. 30, 2020

(54) MANAGING ELECTRONIC SLIDE DECKS

(71) Applicant: Microsoft Technology Licensing, LLC, Redmond, WA (US)

(72) Inventors: Samuel Gavin Smyth, Cambridge (GB); Richard Malcolm Banks, Chertsey (GB); Siân Elizabeth Lindley, Cambridge (GB); Michael William Armstrong, Brandon (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 370 days.

(21) Appl. No.: 15/639,676

(22) Filed: Jun. 30, 2017

(65) Prior Publication Data

US 2018/0349450 A1 Dec. 6, 2018

(51) Int. Cl.
| | | |
|---|---|---|
| *G06F 3/0482* | (2013.01) | |
| *G06F 3/0483* | (2013.01) | |
| *G06F 3/0485* | (2013.01) | |
| *G06F 3/0486* | (2013.01) | |
| *G06N 3/08* | (2006.01) | |

(Continued)

(52) U.S. Cl.
CPC .......... *G06F 16/248* (2019.01); *G06F 3/0482* (2013.01); *G06F 3/0485* (2013.01); *G06F 3/04817* (2013.01); *G06F 16/1873* (2019.01); *G06N 3/088* (2013.01); *G06N 5/022* (2013.01); *G06N 5/048* (2013.01); *G06F 3/0483* (2013.01); *G06F 3/0486* (2013.01); *G06F 16/4393* (2019.01); *G06F 40/197* (2020.01); *G06N 3/08* (2013.01); *H04N 1/00198* (2013.01)

(58) Field of Classification Search
CPC . H04N 1/00198; G06F 3/0482; G06F 3/0483; G06F 16/4393; G06F 17/24; G06F 17/248; G06F 17/30056; G06F 16/248; G06F 16/1873; G06F 3/0485; G06F 3/04817; G06F 3/0486; G06F 40/197; G06N 3/08; G06N 3/088; G06N 5/022; G06N 5/048
See application file for complete search history.

(56) References Cited

U.S. PATENT DOCUMENTS 7,493,561 B2   2/2009  Sareen et al.
7,614,000 B2  11/2009  Villaron et al.
(Continued)

OTHER PUBLICATIONS

Spicer, et al., "NextSlidePlease: Authoring and Delivering Agile Multimedia Presentations", In Journal of ACM Transactions on Multimedia Computing, Communications, and Applications, vol. 8, Issue 4, Nov. 2012, 20 pages.

*Primary Examiner* — Ting Z Lee

(57) ABSTRACT

A computer system edits a first electronic slide deck by reusing content from a second electronic slide deck, the electronic slide decks containing first and second sequences of slides respectively. The computer system identifies at least a second of the slides of the second electronic slide deck as a candidate for insertion in the first electronic slide deck by identifying the second slide as having a target positional relationship with a first slide of the first electronic slide deck. In response to the user accepting a suggestion to insert the second slide into the first slide deck, a version of the second slide is inserted into the first slide deck at a position in the first sequence that is determined automatically by the computer system.

20 Claims, 25 Drawing Sheets

(51) Int. Cl.
  *G06F 16/248* (2019.01)
  *G06F 16/18* (2019.01)
  *G06F 16/43* (2019.01)
  *G06F 40/197* (2020.01)
  *H04N 1/00* (2006.01)
  *G06N 5/02* (2006.01)
  *G06N 5/04* (2006.01)
  *G06F 3/0481* (2013.01)
  *G06F 16/438* (2019.01)

(56) References Cited

U.S. PATENT DOCUMENTS

| | | | |
|---|---|---|---|
| 9,116,989 B1* | 8/2015 | Ehlen | G06F 16/248 |
| 9,507,781 B2 | 11/2016 | Potts et al. | |
| 10,146,800 B2* | 12/2018 | Nauerz | G06F 16/5866 |
| 2007/0294612 A1 | 12/2007 | Drucker et al. | |
| 2009/0210796 A1 | 8/2009 | Bhogal et al. | |
| 2010/0114985 A1 | 5/2010 | Chaudhary et al. | |
| 2011/0022960 A1 | 1/2011 | Glover | |
| 2015/0161183 A1 | 6/2015 | Arnaud et al. | |
| 2016/0103575 A1 | 4/2016 | Nauerz et al. | |
| 2016/0217343 A1* | 7/2016 | Hoffman | G06K 9/6215 |
| 2016/0307210 A1* | 10/2016 | Agarwal | G06Q 10/06316 |
| 2017/0109608 A1* | 4/2017 | Chamberlain | G06K 9/6215 |

* cited by examiner

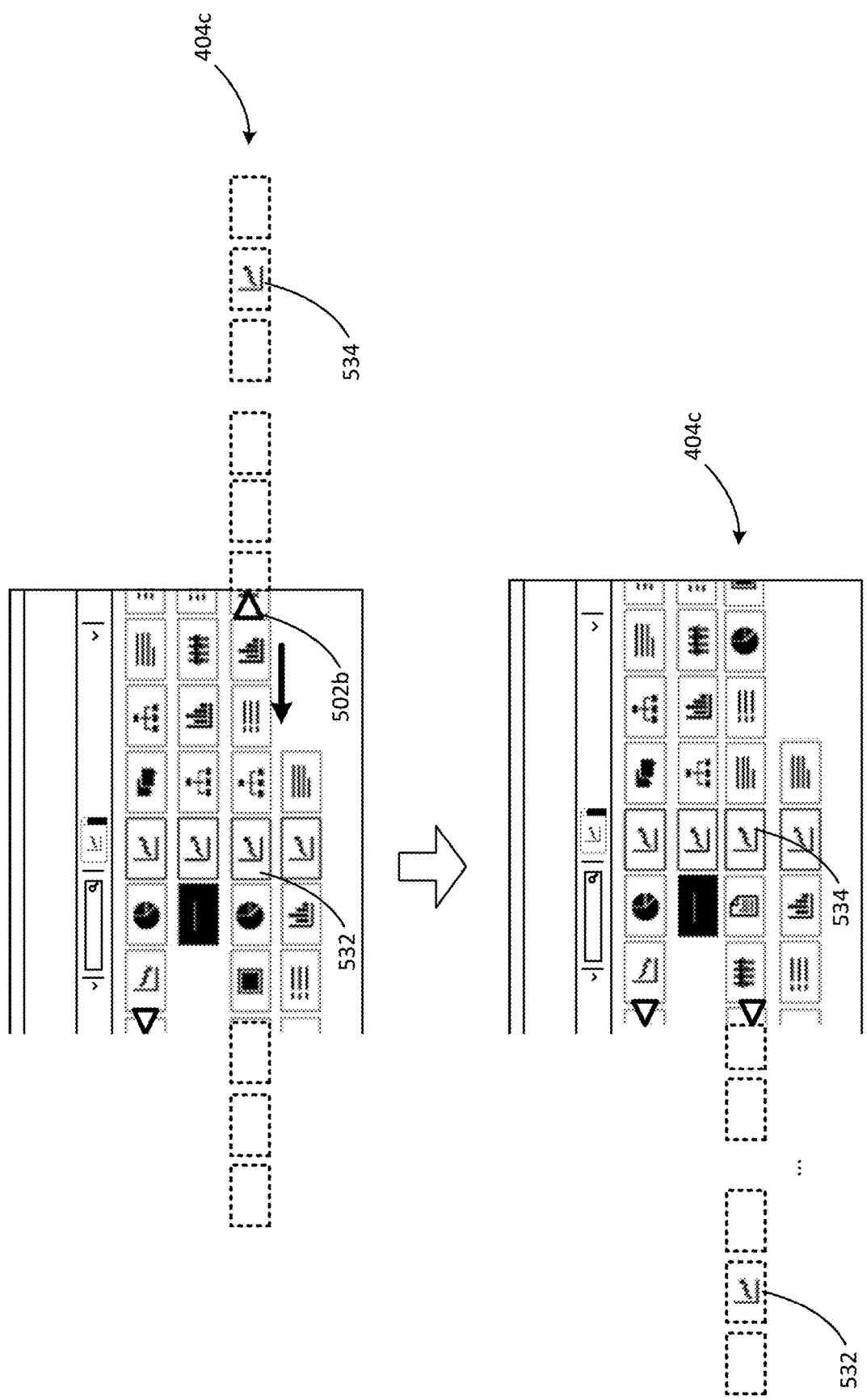

MANAGING ELECTRONIC SLIDE DECKS

CROSS-REFERENCE TO RELATED APPLICATIONS

This application claims priority to GB application serial number 1708764.4, filed Jun. 1, 2017, the entirety of which is hereby incorporated by reference herein.

TECHNICAL FIELD

This disclosure relates to the management of electronic slide decks.

BACKGROUND

Within a computing environment, a user may have a large number of electronic documents such as electronic slide decks. Increasingly, these can end up being stored in numerous places, such as local storage, possibly at multiple personal devices, and remote cloud storage in a disparate fashion, e.g. spread across multiple folders (which might not have been chosen particularly logically); distributed between multiple document management and storage systems, attached to emails etc. Moreover, there will also often be exact duplicates of certain documents (e.g. at various storage locations and attached to emails etc.), or versions with overlapping content, for example different versions that are created as the content is edited, possibly by multiple users e.g. via a collaborative editing application. As the range of options for storing and sharing documents increases, it becomes increasingly hard for a user to keep track of documents, or to locate particular documents of interest. Existing solutions are mainly limited to basic keyword searching of individual document repositories, and a lot of time and effort is often needed on the part of the user to locate documents of interest, particularly if they are not stored in a particularly organized fashion.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A first aspect of the present invention is directed to a computer-implemented method of editing a first electronic slide deck by reusing content from a second electronic slide deck, the electronic slide decks containing first and second sequences of slides respectively, each slide to be presented individually, the method comprising implementing, by a computer system, the following steps: identifying at least a second of the slides of the second electronic slide deck as a candidate for insertion in the first electronic slide deck by identifying the second slide as having a target positional relationship with a first slide of the first electronic slide deck; controlling a user interface to display, to a user, a suggestion to insert the second slide into the first slide deck; and in response to the user accepting the suggestion via the user interface, inserting a version of the second slide into the first slide deck, the version of the second slide being inserted at a position in the first sequence that is determined automatically by the computer system based on a position of the first slide in the first sequence such that the first slide in the first sequence and the version of the second slide in the first sequence have a matching positional relationship.

In embodiments, the computer system may identify a slide in the second sequence as matching the first slide, and identify the second slide as having the target positional relationship with the first slide by identifying the second slide as being offset from the matching slide in the second sequence by a target amount, wherein the version of the second slide in the first sequence is offset from the first slide in the first sequence by a matching amount.

The second slide may be the next slide after the matching slide in the second sequence, and the version of the second slide may be the next slide after the first slide in the first sequence.

The computer system may identify the second slide as having the target positional relationship with the first slide by identifying the second slide in the second sequence as offset from the first slide in the first sequence by a target amount, wherein the version of the second slide in the first sequence is offset from the first slide in the first sequence by a matching amount.

The computer system may identify a group of slides in the second sequence as matching a group of slides in the first sequence, wherein that group includes the first slide, wherein the second slide is identified as a candidate for insertion by identifying the second slide as being offset from the matching group in the second sequence by a target amount, wherein the version of the second slide in the first sequence is offset from the group including the first slide by a matching amount.

The target amount may be predetermined. Alternatively, the target amount is variable. For example, the target amount may be determined by the computer system based on the slides of the second electronic slide deck.

The computer system may implement steps of: identifying a set of multiple slides, in multiple electronic slide decks, as candidates for insertion in the first electronic slide deck, by identifying those slides as having target positional relationships with the first slide; identifying at least one slide of the set of candidate slides as matching a slide that is already present in the first electronic slide deck; and filtering-out the at least one matching slide from the set of candidate slides, whereby the at least one matching slide is not suggested for insertion in the first document.

The computer system may display the suggestion in response to the user selecting the first slide in the first slide deck via the user interface.

The computer system may determine a confidence value for the second slide.

The computer system may identify multiple slides as candidates for insertion in the first electronic slide deck, determine a confidence value for each of those candidate slides, and display respective suggestions for those slides wherein the suggestions are ordered according to their determined confidence values.

The suggestion displayed for the second slide may comprise a display element having a size determined by the computer system as a function of the second slide's determined confidence value.

A second aspect of the present invention is directed to a computer-implemented method of searching a set of electronic slide decks using a target slide of a first electronic slide deck, each of the electronic slide decks containing a sequence of slides to be presented individually, the method comprising implementing, by the computer system, the following steps: receiving, from a user via a user interface, a user input individually selecting the target slide as a search input from the slides of the first electronic slide deck; comparing the target slide with the slides of each electronic slide deck in the set to determine whether any of those slides matches the target slide, so as to determine, for each of the set of electronic slide decks, whether that electronic slide deck contains at least one slide that matches the target slide; and controlling the user interface to display a set of search results in response to the user input, wherein each of the search results represents one of the electronic slide decks determined to contain at least one matching slide, wherein any electronic slide decks that are determined not to contain any matching slide are excluded from the search results.

In embodiments, for each of the slides compared with the target slide, the computer system may assign a match score to that slide with respect to the target slide, wherein that slide is determined to match the target slide if the match score is above a matching threshold.

The computer system uses only selective information to determine the match score. For example, the computer system may use only selective content of the slides.

The computer system may determine the match score by comparing a limited portion of content of the target slide with a corresponding limited portion of content of that slide, wherein the match score is independent of the remaining content of those slides.

The computer system may compute respective metadata from the limited content portions, wherein the limited content portions are compared by comparing their respective metadata.

The metadata may be stored separately from the slide decks whereby said comparison is performed without accessing the slide decks. The may be pre-computed before the target slide is selected. For example, the metadata may be cached in a data store before the target slide is selected for use in said comparison.

The content may be visual content and the comparison may be performed using visual matching.

The metadata for each of the limited content portions may comprise a visual fingerprint derived from that portion of content, whereby the visual fingerprint is independent of the remaining content of that slide, wherein the limited content portions are compared by comparing their respective visual fingerprints.

The limited portion may be a middle portion of the visual content of the slide, the remaining content being a top portion and a bottom portion of the visual content.

The computer system may assign a type to each of the slides, wherein the comparison is performed in dependence on the determined type. For example, the target slide may only compared with slides of the same type as the target slide, whereby only that type of slide is included in the search results.

The computer system may select, based on the type of the target slide, one of a plurality of available comparison modes to perform the comparison.

A third aspect of the present invention is directed to a computer-implemented method of managing an electronic slide deck, the electronic slide deck containing a set of slides to be presented individually, the method comprising implementing, by the computer system, the following steps: processing the slides of the electronic slide deck to autonomously group the slides into a plurality of groups, wherein the computer system performs the autonomous grouping by identifying the slides in each of the groups as having related content; generating, in association with the electronic slide deck, grouping data in electronic storage accessible to the computer system, the grouping data denoting the identified groups of slides; and controlling a user interface based on the stored grouping data to convey, to a user, information relating to at least one of the identified groups of slides.

The computer system may control the user interface to display a representation of the electronic slide deck, the representation being formed of a plurality of display elements, each of the display elements representing one of the slides of the slide deck, wherein at least two of those display elements represent individual slides in the identified group, wherein in response to a user input via the user interface, the computer system modifies the representation of the electronic slide deck so as to represent all of the slides in the identified group by a single display element instead.

The single display element may be selectable via the user interface to incorporate all of the slides of the identified group into a new or existing electronic slide deck simultaneously.

The user interface may be controlled by a document editor executed at the computer system to output a notification to the user in response to the user attempting to delete one or more, but not all, of the slides in the identified group, wherein the notification notifies the user that the one or more slides he has attempted to delete are part of an identified group.

The notification may have an option to confirm the attempted deletion was intentional, wherein selection of that option causes the document editor to delete the one or more slides.

The document editor may only allow deletion of the whole group of slides, and the notification rejects the attempted deletion in that event.

The set of slides may comprise a sequence of slides and the identified group may be a contiguous run of slides in the sequence.

For each of the slides in the set, the computer system may assign a match score to that slide with respect to at least one other of the slides in the set, wherein the slides are identified as having related content by comparing their match scores with a similarity threshold.

A match score may be assigned to each slide with respect to every other slide in the set.

The computer system may determine the match score by comparing a limited portion of content of the slide with a corresponding limited portion of content of the other slide, wherein the match score is independent of the remaining content of those slides.

The computer system may compute respective metadata from the limited content portions, wherein the limited content portions are compared by comparing their respective metadata.

The slides may be identified as having related visual content using visual matching.

Alternatively or in addition, the slides may be identified as having related text content using text matching.

Alternatively or in addition, the slides may be identified as having related content using structure information in the slide deck.

Alternatively or in addition, the slides may be identified as having related content by performing a cross-deck comparison of those slides with slides in one or more other electronic slide decks.

Alternatively or in addition, the slides may be identified as having related content by a trained model which has been trained according to slide grouping inputs from a user. The model may have been trained using supervised learning, unsupervised learning or a combination of both.

The set of slides may comprise a sequence of slides and the identified group may be a non-contiguous group of slides in the sequence.

A fourth aspect of the invention is directed to a computer-implemented method of editing a first electronic document by reusing content components from at least a second electronic document, each of the electronic documents containing a set of content components, the method comprising implementing, by the computer system, the following steps: processing the content components of the second electronic document so as to identify one or more groups of content components, by identifying the content components in each group as having related content; and controlling a user interface to simultaneously display a plurality of display elements to represent the second electronic document, wherein each of the display elements represents a group of content components identified in that document or an individual content component of that document, wherein at least one of the display elements represents a group and at least one of the display elements represents an individual content component, wherein each of the display elements is selectable to cause the computer system to incorporate the content component or group of content components it represents into the first electronic document, whereby a user can incorporate a group of content components into the first electronic document without selecting them individually whilst still being able to incorporate individual content components.

A fifth aspect of the invention is directed to a computer-implemented method of managing first and second electronic documents, each of the electronic documents containing a sequence of content components, the method comprising implementing, by the computer system, the following steps: controlling a user interface to display: a first sequence of display elements to represent the first electronic document, and a second sequence of display elements to represent the second electronic document, wherein each of the display elements in each of the displayed sequences represents an individual content component or group of content components of the electronic document represented by that sequence, wherein each of the displayed sequences has an order that matches the order of the content components in the document it represents, wherein the first and second sequences are displayed alongside each other, with their respective display elements in an initial alignment, to allow a side-by-side comparison of the electronic documents; and in response to a user individually selecting, via the user interface, one of the display elements of the first sequence, identifying one of the content components of the second electronic document as meeting at least one alignment criterion with respect to the content component of the first electronic document represented by the selected display element, and controlling the user interface to re-align the sequences, so as to align a display element of the second sequence, representing the identified content component, with the selected display element of the first sequence, without changing the order of the displayed sequences.

In embodiments, the computer system may identify the content component of the second electronic document as matching the content component of the first electronic document, thereby identifying the content component of the second electronic document as meeting the at least one alignment criterion with respect to the content component of the first electronic document.

The content components may be identified as matching based on their content, based on metadata associated with those content components, or a combination of both.

The first and second sequences may be displayed in response to a search input received from a user via the user interface, wherein the first and second documents are identified by the computer system as matching at least one search parameter of the search input.

The first or second electronic document may be one of multiple duplicate electronic documents that all match the at least one search parameter, which are collectively represented by the first or second sequence of display elements, whereby the multiple duplicate electronic documents are all represented by a single sequence of display elements.

Respective information about each of the multiple duplicate electronic documents may be displayed in association with that sequence of display elements, to convey that the sequence represents multiple electronic documents.

The search input may select an individual content component, and the first and second documents may be identified by the computer system as each containing at least one matching content component.

The first or second electronic document may be one of at least two electronic documents that the computer system identifies as similar based on at least one similarity criterion applied to their content components, wherein the at least two similar electronic documents are represented on the user interface by at least two sequences of display elements, wherein in response to a user input via the user interface, the computer system controls the user interface to replace the at least two sequences with a single sequence of display elements that represents all of the similar electronic documents.

The at least one similarity criterion may be applied by determining a number of matching content components across the at least two electronic documents.

The matching content component may be one of a plurality of content components of the second electronic document identified by the computer system as matching the content component of the first electronic document; wherein in response to a user input via the user interface, the computer system controls the user interface to re-align the sequences again, so as to align another display element of the second sequence, representing another of the matching content components, with the selected display element of the first sequence, without changing the order of the displayed sequences.

The computer system may display a selectable option to change the alignment of the sequences, the user input being instigated by a user selecting the selectable option via the user interface.

The display elements have uniform sizes. Alternatively, the display elements have sizes that vary in dependence on the content components they represent.

Each of the display elements in each of the sequences may comprise at least some content of the content component it represents, whereby that content is displayed as part of that sequence.

The electronic documents may be electronic slide decks. Each of the content components may be an individual slide.

The computer system may scroll though the displayed sequences in response to scroll inputs received via the user interface, wherein upon reaching the start or end of the sequence representing one of the electronic documents, the display element representing the first or last content component of the electronic document remains displayed as the user continues to scroll (i.e. "pinned" to the user interface), whereby the electronic document continues to be represented as the user continues to scroll.

A sixth aspect of the invention is directed to a computer-implemented method of managing first and second electronic documents, each of the electronic documents containing a sequence of content components, the method comprising implementing, by the computer system, the following steps: processing the content components of each of the electronic documents so as to identify one or more contiguous runs of content components, by identifying the content components in each run as having related content; and controlling a display to display: 1) a first sequence of uniform display elements to represent the first electronic document, wherein each of those display elements represents a contiguous run of content components identified in that document or an individual content component of that document which is not part of any identified run, wherein the first sequence of display elements has an order that matches the order of the content components in the first electronic document, and 2) a second sequence of uniform display elements to represent the second electronic document, wherein each of those display elements represents a contiguous run of content components identified in that document or an individual content component of that document which is not part of any identified run, wherein the second sequence of display elements has an order that matches the order of the content components in the second electronic document; wherein at least one of the display elements represents a contiguous run and at least one of the display elements represents an individual content component, wherein the first and second sequences are displayed alongside each other to allow a side-by-side comparison of the electronic documents.

Another aspect of the invention is directed to a computer system comprising: computer storage configured to hold executable instructions, and at least one processor coupled to the computer storage and configured when executed to implement any of the functionality or method steps disclosed herein.

Another aspect of the inventions directed to a computer program product comprising computer readable instructions stored on a computer readable storage medium and configured when executed to implement any of the functionality or method steps disclosed herein.

BRIEF DESCRIPTION OF FIGURES

For a better understanding of the present invention, and to show how embodiments of the same may be carried into effect, reference is made by way of example only to the following figures in which:

FIGS. 5A-C illustrate an example of how the filmstrip GUI can handle multiple matches in a set of search results;

DETAILED DESCRIPTION OF EXAMPLE EMBODIMENTS

Embodiments of the invention will now be described by way of example only.

Figure 1:
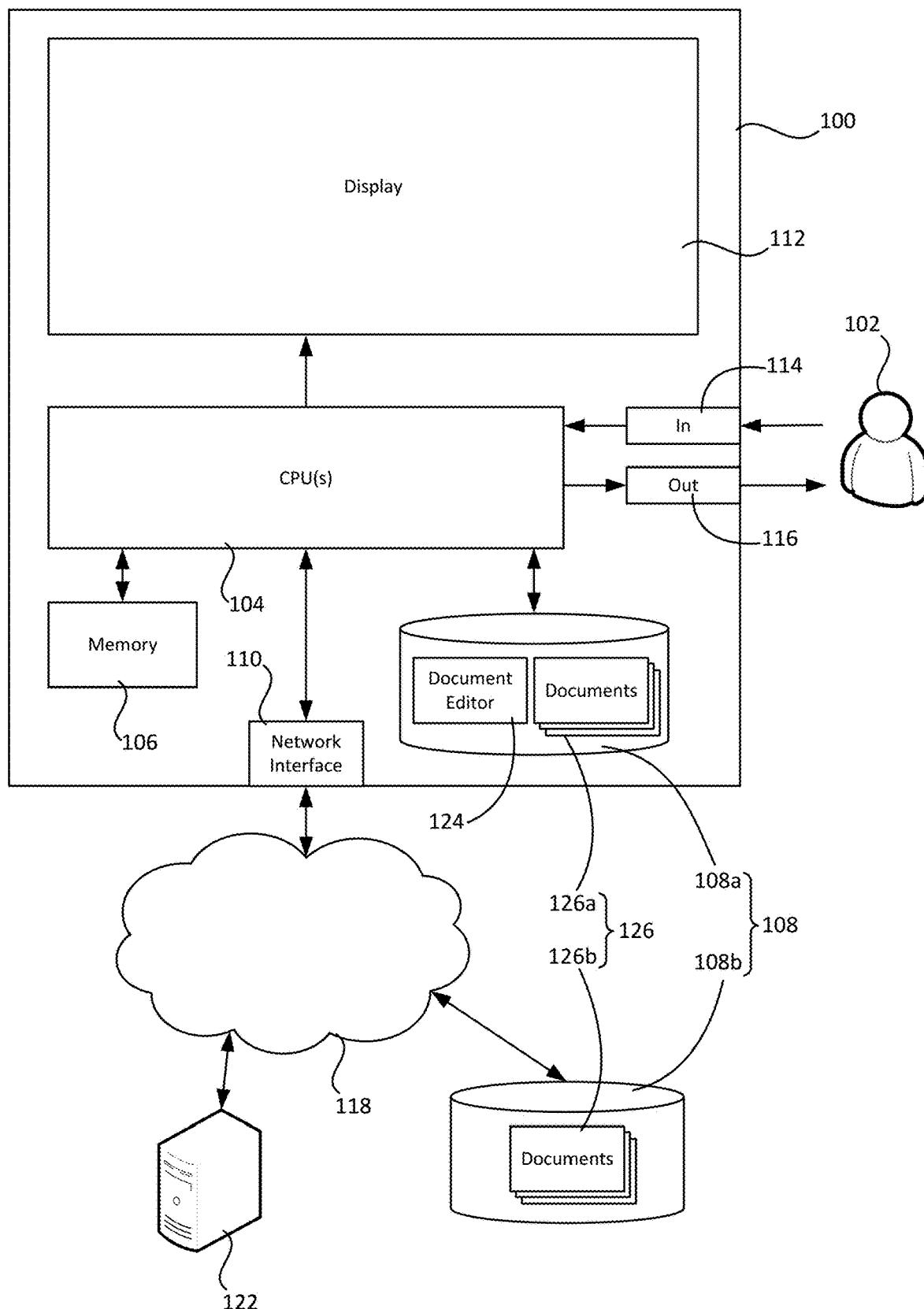
FIG. 1 shows a schematic block diagram of a computing device operated by a user.

FIG. 1 shows a schematic block diagram of a computing device 100 operated by a user 102, and which can be used by the user 102 to access, view, create and edit electronic documents. The computing device 100 can take a number of forms, such as that of a personal computer (PC), laptop or desktop; tablet device; smartphone, particularly one with a larger screen (such as so-called "phablet" devices); virtual or augmented reality (VR/AR) device, such as a VR/AR headset, or any other form of computing device that is conducive to the tasks at hand.

The computing device 100 is shown to comprise at least one processor 104, such as a CPU or set of CPUs (e.g. in a multicore processor) and, coupled to the processor 104, processor memory 106, which comprises a main memory accessible to the processor 104 and may also include other forms of processor memory, such as a processor cache; one or more local computer storage devices 108a (local storage), a network interface 110; a display 112; one or more input devices 114, such as a touchscreen, trackpad, mouse, image capture device for gesture detection, audio input device for speech recognition, or other form of so-called "natural" interface etc.; and (in some cases), one or more output devices 116 in addition to the display 112. Via the network interface 110, the computing device 100 can connect to a network 118, which is a packet-based computer network such as the Internet. This allows the computing device 100 to access one or more remote data stores 108b (remote storage) via the network 118, and to communicate with remote devices, such as a server or servers 122.

The display 112, input device(s) 114 and any other output device(s) 116 constitute a user interface (UI) of the computing device 100.

A document editor 124 is shown stored in the local storage 108a. The document editor 124 is an executable computer program for use in creating and editing electronic documents, such as local documents 126a held in the local storage 108a and remote documents 126b held in remote storage 108b (documents 126, collectively). In order to execute the document editor 124, the processor 104 loads instructions of the document editor 124 into the processor memory 106 and carries out operations in accordance with those instructions to implement the functionality of the document editor 124.

Within the local/remote storage (storage 108, collectively) each of the documents 126 is, in this example, embodied as an individual file that is managed by a file system associated with the storage device in question. As is well known in the art, the file system is used to control the storage and retrieval of data from the storage 108, wherein each file constitutes a self-contained, computer-interpretable unit that can be easily retrieved and moved between storage devices.

The local and remote storage 108, 108b are both examples of "external" storage in the sense that they are external to the processor 104, though the local storage 108a may or may not be external to the computer device 100 itself (i.e. it could be integrated in the computing device 100, peripheral to it or a combination of both). Typically, when the document editor 124 creates a new document, that document is created initially in the processor memory 106. That is, the document is embodied at that point as an in-memory data structure. The processor can then transfer the document to the local or remote storage 108a, 108b to "save" the document (automatically or in response to user input), at which point that document becomes embodied in a file stored in the storage device in question. Likewise, when an existing document is edited, the document "opens" the existing file embodying that document, typically by copying at least part of its content into the processor memory 106 where it can be modified. The modified content can them be transferred back to the original file to replace the original content. As will be appreciated, this is a simplified description for the purposes of illustration, and different types of document editor may manage documents in different and potentially more complex ways. A brief overview of these functions is provided to make the point that, whilst an "electronic document" may be a document embodied as a file in external storage that is managed by a file system, an electronic document may also be embodied as an in-memory data structure that only exists within the processor memory 106. Herein, an "electronic slide deck" (equivalently referred to as a "presentation") is one type of electronic document, so this applies equally to electronic slide decks.

Examples of electronic file formats include plain text (e.g. TXT, CSV etc.), rich text (e.g. RTF, the various Microsoft (R) Word Document formats and other similar word processing formats), spreadsheet formats (Excel (R) etc.), electronic slide deck formats, PDF etc. As is well known, copies of a particular document can be saved as different file formats, and it may be that the document is only tied to a particular format once it is actually saved as a file, e.g. word processors, spreadsheet and slide deck editors may be able to save rich text in a variety of different file formats, which in some cases may be tied to particular versions of the software. Before that point, when part or all of the document may, depending on the implementation of the document editor 124, only exist in the processor memory 106, the in-memory data structure embodying that (part of the) document is generally closely tied to the design of the document editor, and can therefore vary significantly between different document editors.

With these considerations in mind, the term "electronic document" is used herein to mean a self-contained, electronically stored piece of content, typically containing text (character strings), image data or a combination of both, which is susceptible to interpretation by a human, preferably by rendering at least part of that content on a display, and which can for example be embodied as a file or set of files in external storage (in the above sense), or embodied as some other data structure which may be susceptible to rendering as a file in electronic storage, so that it can be managed by a computer-implemented file system. A document could be an individual file, multiple files, or it could be stored as something other than a file or files (e.g. in cloud storage).

The content can be user-generated, but in some cases it may be automatically generated, such as automatically generated log files (trace logs, database logs etc.).

This disclosure is focused on a particular type of electronic document, namely slide decks, containing a sequence of discrete content components in the form of individual slides, which are clearly delineated by structural elements (inter-slide boundaries) of the document, and which have a clearly defined order within the document relative to one another. The slides are such that they can be rendered in a consistent manner on a display regardless of the internal content type The system can allow for different sized slides as well as identical ones.

In the examples described below, each of the documents 126a, 126b is an electronic slide deck containing a sequence of slides. Examples of document editors that can be used to create and edit electronic slide decks include Microsoft (R) PowerPoint (R), Apple (R) Keynote, OpenOffice Impress and other so-called "presentation programs" with document editing capabilities etc. Usually, these operate on a WYSI-WYG ("What You See Is What You Get") basis, whereby the user 102 creates slides by manipulating displayed objects via a GUI so that he (including she) can see what each slide looks like as he edits it. Each slide has content, such as text (character strings), static images or even video images. For example, some document editors allow a video image to be embedded in a slide, which can be played out whilst that slide is presented. Static images can be imported into the slides, or they can be created within the document editor itself. Whether they are imported or created within the document editor itself, such images can be represented for example as an array or arrays of pixel values, e.g. jpeg, bitmap images etc., or using so-called "vector graphics" where the image is represented geometrically.

As is well known in the art, a presentation program displays information in the form of a slide show, by executing an electronic slide deck. In order to execute the electronic slide deck, each of the slides is presented (displayed) individually in turn, often on a large display screen or via a projector to an audience. Depending on the implementation there may be animation effects which mean that information from multiple slides is visible simultaneously during the effect, and some presentation programs may allow a user to deviate from the order of the slides, for example by skipping certain slides. The slides are displayed at a rate such that each slide is individually perceptible to a human eye, preferably for long enough that a viewing user has time to take in the information the slide contains. Transitions between slides are often instigated manually, though automatic transitions are also possible. A presentation program may have slide editing capability, or it may simply be capable of presenting the slides but not editing them—sometimes referred to as a "viewer" application. References to "electronic slide decks" should be construed in this context.

Over time, users may build up a large number of slide decks. Often, users will create new slide decks by re-using slides from existing decks. For example, a researcher may create numerous slide decks over time relating to a particular area of research, which are adapted depending on the length of a talk, the background of the intended audience, or as the research develops. As well as overlapping decks, often identical decks may be stored in various places, for example identical copies in local storage, (shared) cloud storage, and archived as email attachments which the user has sent to another user(s) or received from another user. This can lead to numerous slide decks with overlapping or identical content, often stored in disparate places. This is exacerbated when slide decks are shared, for example to allow collaborative editing or simply via email, or if the user is undisciplined about where he saves his slide decks, resulting in the creation of more and more overlapping slide decks over time.

To this end, the described embodiments of the invention provide what is referred to herein as a "SlideScope" system (referred to simply as SlideScope for conciseness, and equivalently referred to as a "slide processing system"). SlideScope is a computer system, which provides a GUI with various novel aspects for navigating slide decks in a simple and intuitive manner. That is, the term "SlideScope" is merely a convenient shorthand for a computer system configured with functionality as described herein, and there is no significance to this particular choice of name.

Within the SlideScope GUI, individual content components (e.g. slides) are "atomic" in the logical sense, in that, at the GUI level, they are not broken down into their constituent elements but are treated as the "smallest" unit of data.

Figure 2:
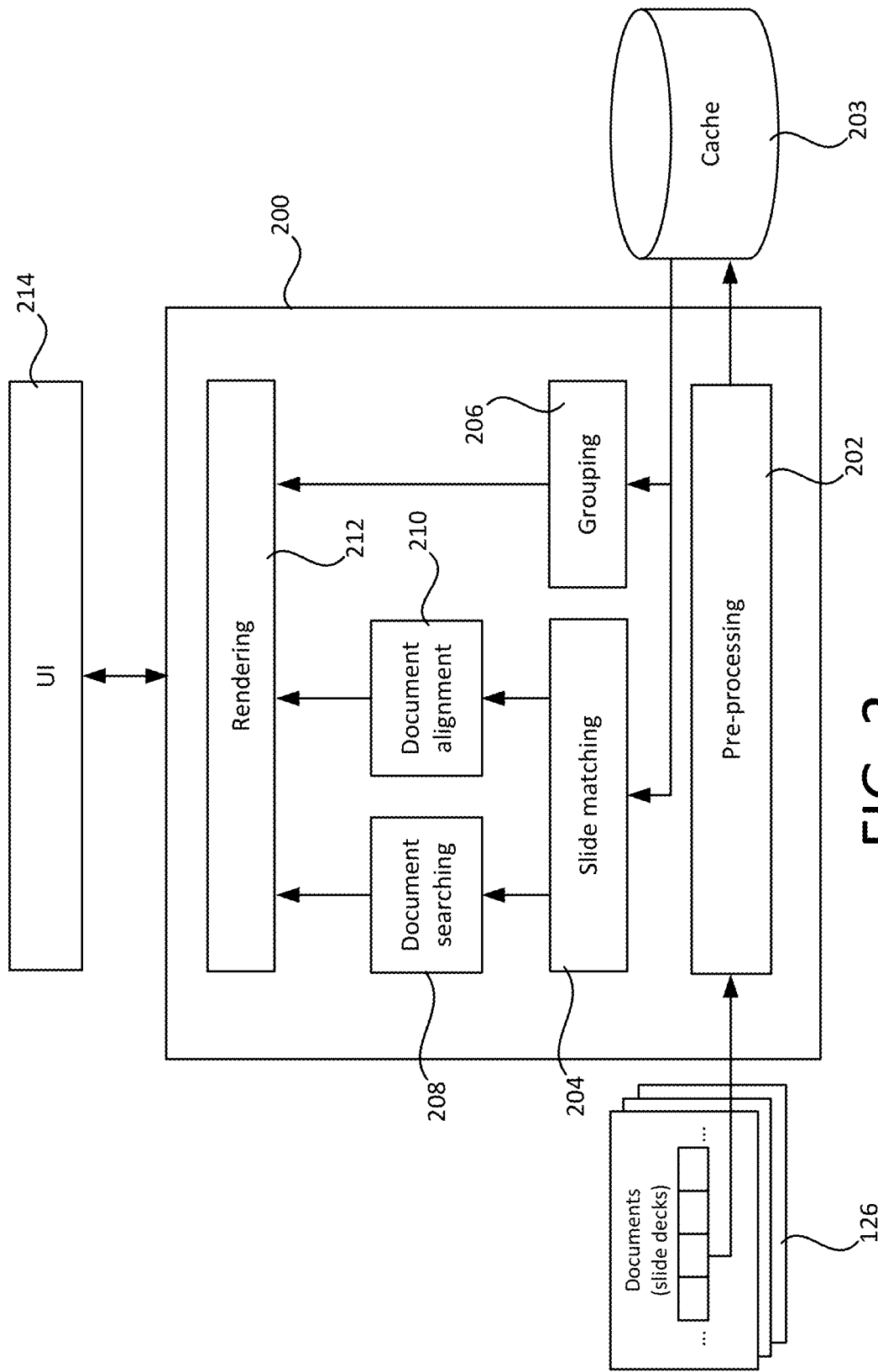
FIG. 2 shows a function block diagram for a computer system, in accordance with various embodiments of the present invention.

FIG. 2 shows a functional block diagram for the SlideScope system 200, which is shown to comprise a pre-processing component 202, a slide matching component 204, a grouping component 206, a document searching component 208, a document aligning component 210, and a rendering component 212.

SlideScope can control the UI of the computing device (214 in FIG. 2), and in particular the display 112 in order to output information to the user 102, and can also receive user input from the user 102 via the UI 214. That is, via the input device(s) 114.

Each of the depicted components of SlideScope is a functional component, representing part of SlideScope's functionality. This functionality is implemented in software; that is by computer readable instructions (code) executed on a processor (e.g. CPU or CPUs) or processors of SlideScope. For example this functionality can be implemented by the computing device 100 itself. For example, it can be integrated in the document editor 124, or implemented by a separate program that can execute independently of the document editor 124, but which is able to cooperate with the document editor 124 where necessary to carry out the functions described herein. Alternatively, the functionality can be implemented remotely from the perspective of the computing device 100, for example by a server 112 or a plurality of cooperating servers. In this context, the computing device 100 and SlideScope system 200 communicate via the network 118 in order to carry out the functions described herein. For example, SlideScope can be implemented in on a so-called "cloud computing" platform, as a cloud service that is delivered via the network 118. Alternatively, part of SlideScope can be implemented locally at the computing device 100 and part remotely. As such, at the hardware level, SlideScope can be implemented on a single device or on multiple devices, in a distributed or localized fashion.

The operation of SlideScope, and various possible implementations, are described in detail below, but first an overview of its operation is described by way of introduction.

The pre-processing component 202 processes individual slides of the slide decks 126 to allow slides within decks and across different decks to be compared with one another. It does this by selectively extracting information from the slides, and outputting it in a structured way that facilitates an efficient comparison.

This pre-processing can, for example, comprise generating a visual "fingerprint" of the slides to allow visual matching. Fingerprinting is well known in the art, so the details are not discussed herein. Suffice it to say that an electronic fingerprint (also called a signature) is typically generated by converting the slide to a pixel representation (that is "flattening" the slide to form an pixel image), and then generating a fingerprint from the pixel values that captures the visual characteristics of the image in a way that allows it to be efficiently and effectively compared with other fingerprints. One example of a known fingerprinting technique that can be used is PhotoDNA.

In this context, the difference between fingerprints constitutes a similarity measure (match score) that is used to assess whether slides match. Other types of similarity measure can be used alternatively or in addition, and various examples are described later.

The pre-processing could also comprise processing and extracting text from slides, for example to autonomously identify relevant keywords or phrases in the slide to allow text-based matching with other slides. In one of the examples described below, the pre-processing component classifies slides based on their content (e.g. as primarily text or image based), to allow the most appropriate matching to be performed by that slide, or to lend greater weight to a certain type of matching. That is, it determines a type of the slide.

In the present examples, the pre-processing component 202 caches the information obtained though pre-processing (metadata) in a data store 203 (cache), to allow searches to be performed on the cached metadata.

Alternatively, the pre-processing component 202 could be implemented as part of an augmented data store in which the documents are stored along with this information (rather than in a separate cache), and the augmented data store can provide this information to the other system components when needed.

The primary function of the slide matching component 204 is to identify matching slides across different decks. That is, slides in different decks which are identical or sufficiently similar that a user would consider them to have content in common.

The function of the grouping component is to identify slides within the same deck that have related content, and to group those slides together. These can be contiguous "runs" of adjacent slides; that is subsequences of the sequence of slides contained in that deck, as well as more general groupings that do not require the slides to be adjacent. That is, slides which the user 102 would consider related and which he is therefore likely to use together when reusing them in a new deck. This grouping can be performed autonomously by the system 200 without intervention from the user, though it may use information that the user has provided previously such as structural information within the decks or predetermined settings set by the user.

As will be appreciated, determining when slides are matching, similar or related in this sense is not an exact science. In practice, a certain degree of system tuning may be needed to obtain the desired behaviour that meets users' expectations, by way of normal design practice. Moreover the criteria on which these are judged may be adjustable by the user, to suit his own needs. As such, whether or not slides are considered similar, related or matching may vary depending on the context, but it will be clear to the skilled person when these criteria are met in the context of any given system.

In order to determine whether a given slide matches a target slide, a match score can be determined for the given slide with respect to the target slide. The match score is determined by comparing the respective content of those slides. In some cases, part of the content can be excluded. For example, where the comparison is based on the slides' visual content, a portion of the visual content (e.g. top and bottom 10%) can be excluded (see below). The comparisons can be indirect, whereby the metadata, such as visual fingerprints, derived by the pre-processing component from the limited portions of the slides' visual content is compared to determine the match score. A pair of slides is determined to match if their match score is above a matching threshold—a form of "fuzzy" (approximate) matching.

Slide matching is used, by the document searching component 208, as a basis for searching the slide decks, whereby the user 102 can select a target slide from a current deck and request the system to locate any other decks that contain a matching slide. Slide matching is also used, by the document aligning component 210, to align visual "filmstrip" representations of slide decks, whereby a target slide is selected in one of the decks and the film strip representations are rendered such that a matching slide of another deck(s) is aligned with the target slide. Slide matching can also be used to find identical/similar slides within the same deck.

The slide decks that are searched by SlideScope generally exist as files in external storage (local, remote or a combination of both), and can be accessed by SlideScope in the area(s) of external storage in which they are stored. In the present examples, this is part of the pre-processing which is used to generate the metadata in the cache 203, so that the metadata can subsequently be searched to find matching slides without having to access the original slides themselves. For example, the user may nominate an area or areas of storage (such as a folder within a file system, an email mailbox, a shared data repository, such as cloud storage, e.g. Sharepoint) to be searched, via SlideScope's GUI. The target slide used for searching can be accessed from a file, or it may only exist at that point in the processor's main memory (for example, the user may be able to "drag and drop" the target slide of a presentation he is currently editing from a GUI of the document editor 124 into SlideScope's GUI, without having to save the current presentation first).

Slide matching can be performed dynamically in response to the user selecting the target slide, or, where possible, slides can be pre-matched and data about the matching can be stored to allow search results to be returned faster. For example, SlideScope may pre-match slides of any presentation files stored in the user's nominated storage area(s), and record any matches it finds. For example, for each pair of matching slides, SlideScope may generate metadata associated with each slide in a pair of matching slides, which identifies the other slide in the pair of matching slides. This allows the matching slide to be located extremely quickly when the user instigates a search. SlideScope can implement a combination of pre-matching and dynamic matching, by performing pre-matching where possible and reverting to dynamic matching for slides that have not been pre-matched for any reason. The pre-matching can be implemented as a background process that runs "silently" in a manner that is essentially invisible to the user. As another example, even if slides are not pre-matched, the information to enable the matching (e.g. fingerprints etc.) can be derived by the pre-processing component in advance, and stored in association with the slides (although this could also be derived dynamically in other cases, where necessary).

In the present examples, slides are not searched from their original locations, rather all searching occurs within the pre-processed metadata in the cache 203. This allows much faster searching.

It is noted however that, whilst the pre-processing component 202 can be beneficial in terms of providing faster searches/matching, it is not essential. The required information could be determined dynamically instead.

Moreover, it is not necessarily essential for the system to derive metadata from the content of the slides in order to link them together (whether through pre-processing or otherwise).

If SlideScope has no information about user behaviour, i.e. nothing that signals that the user made use of slide N from deck A when creating deck B (for example), then it can compare their content to find similar slides and make an assumption that those represent reuse of content. It can also infer the ordering of reuse from timestamps, for example by assuming that a slide in a later deck will have come from an earlier one. In this context, deriving metadata from the content, such as visual fingerprints for visual matching, is a useful way of identifying related slides. As these relationships are inferred, the system builds up a graph embodying these inter-slide relationships.

However, if the system is able to capture copy-paste or save actions (or similar) as behaviours, this could also support a similar user experience, with less pre-processing overhead and with less need to derive metadata from the content of the slides. The graph could instead be build up by tracking such actions (or using a combination of content comparison and action tracking).

By recording information that signals that, say, the user made use of slide N from deck A when creating deck B, the system can keep track of the relationships between slides with less or no pre-processing overhead. For example, if the system can capture a user action of copying content from one document to another, it can link the relevant slides directly, and (where appropriate) could still retain the linkage between the source and destination slides when the user changes things after pasting. There are other actions too, such as save-as, or operating system level file copying, or emailing, etc. that could be tracked in a similar manner to infer relationships between slides to build up the graph of inter-slide relationships. Such tracking could be assisted by per-slide identifiers (slide IDs) that can be used to keep track of the links between slides. It could be the document editor 124 itself that is configured to track and record these actions using the appropriate slide identifier. With those linkages directly represented (in the document, or elsewhere), the system wouldn't have to spend as much time (re)building the graph.

Whether the graph of inter-slide relationships is built up based on visual or other content comparisons, by tracking user actions, by any other means or any combination thereof, this can be performed at the pre-processing stage. However, for the absolute avoidance of doubt, it is noted once again that pre-processing is not essential, and that they system can therefore be implemented without pre-processing or with differing levels of pre-processing. Any operation that is described herein as being part of the pre-processing stage, such as the deriving of links between slides, can be implemented dynamically if and when it is needed instead, for example when a user requests a search or triggers a recommendation (see below).

Slide grouping allows the groups of related slides to be manipulated easily, without the user having to individually select those slides. For example, a group of slides identified as having related content can be incorporated into another deck (e.g. a deck the user is currently editing, or a new deck created at that point) in one go. Slide grouping can also be used in rendering the filmstrip view, by collapsing runs within each filmstrip (see below). Slide grouping can also be used for navigation, e.g., if a slide or run is also "linked" to (i.e. determined to be related to) one or more appendix slides, a quick action could be provided to hop between the body slide(s) and the corresponding appendix slide(s) automatically.

As noted, the matching, both to determine which slides to align across decks and which slides make up runs, can be based on approximate visual comparisons but other mechanisms could be used alternatively or in addition, such as text matching or a combination of text and visual. All the techniques described herein in relation to detecting matching slides can be applied equally to detecting groups of slides, and vice versa.

1. Slide-Based Searching

It is often the case that the same content is duplicated multiple times in a data repository, such as in multiple files. In particular, the same or very similar slides may be used across multiple decks. This might result from copy-paste, 'insert', or file 'save as' user actions. However, it is often difficult for users to keep track of or revisit how content has propagated across files, and this might be especially problematic in shared repositories where multiple users work with the same content. Having access to this information would be useful for a number of scenarios, including updating content across multiple files, collating content on the same topic, finding all the versions of a file, or inspecting how a piece of content has been interpreted or described over multiple files.

An important feature of SlideScope is that an individual slide can be used to trigger a file search. That is, SlideScope can use individual slides to search for other files that also contain matching slides, i.e. slides with matching content. This can be done by capturing a visual fingerprint of every slide in a corpus of decks. When a slide is selected to initiate a search, slides that are visually similar are returned, being presented as part of the file they are in (using a filmstrip view—see section 2 below).

To limit the effects of the same content being presented in slide decks that use different layouts, SlideScope limits characteristics of the slides used for searching such that similar content is found. For example, where visual matching is used as a basis for searching, some of the visual content of each slide can be discarded. For example, a simple approach ignores the top and bottom 10% of the slide when analysing slide similarity, as different layouts often disproportionately affect these areas within a deck. For example, the visual fingerprint can be generated from only the image data remaining once the top and bottom 10% have been excluded. Ignoring formatting means that variations on the 'same' (i.e. matching) data components can be found.

Alternatives include stripping all styles (removing backgrounds, reducing all text to the same typeface, removing colours from diagrams, etc.) and then producing the fingerprints; or normalising the size of diagrams or images on slides such that the same figure represented in different locations/sizes on different slides will be recognised as the same.

The text across the slides can also be processed to identify text that is unique to particular slides, for example by filtering-out words or phrases that appear across all of the slides or many of the slides. This is essentially a binary weighting, where text is either included or discarded based on the number of slides it appears in. This can be generalized, whereby words or phrases can be assigned a range of weight values in dependence on how many slides they appear in, where words/phrases that only appear in a smaller number of slides are given a higher weighting than those which appear in a larger number of slides. This can be extended to cross-deck comparison, to give a greater weighting to text that is considered unique to a particular deck. This allows words that are very common across decks to be discarded or given a low weighting, as they are unlikely to be useful when it comes to matching up slides.

Slides may also have notes attached. These are generally not visible to an audience when the slides are presented, but are visible to the presenter. These may or may not be used in matching slides, depending on the implementation. Whether or not to use notes may be the user's choice.

The UI presents slides in the context of the decks they form part of, as described in the next section.

2. Filmstrip View

SlideScope can displays multiple versions of the "same" slide deck simultaneously, in parallel to one another, making it easy to see differences and divergence. The system allows users to line these streams up using content that is common between them, thereby helping highlight differences. The user aligns these streams by selecting an individual slide in one of the decks, and the other decks are aligned to this selected slide.

There are situations when a user has a collection of many instances of very similar data, and is interested in exploring the differences between those data sets. One example is different versions of some document (which may include variations across time, as the document evolves, and variations across location, where the document is edited for different purposes). When creating a new version, the user may wish to look at the differences between all of the items in this collection, to ensure that the most appropriate material is collected for this new instance.

Figure 3:
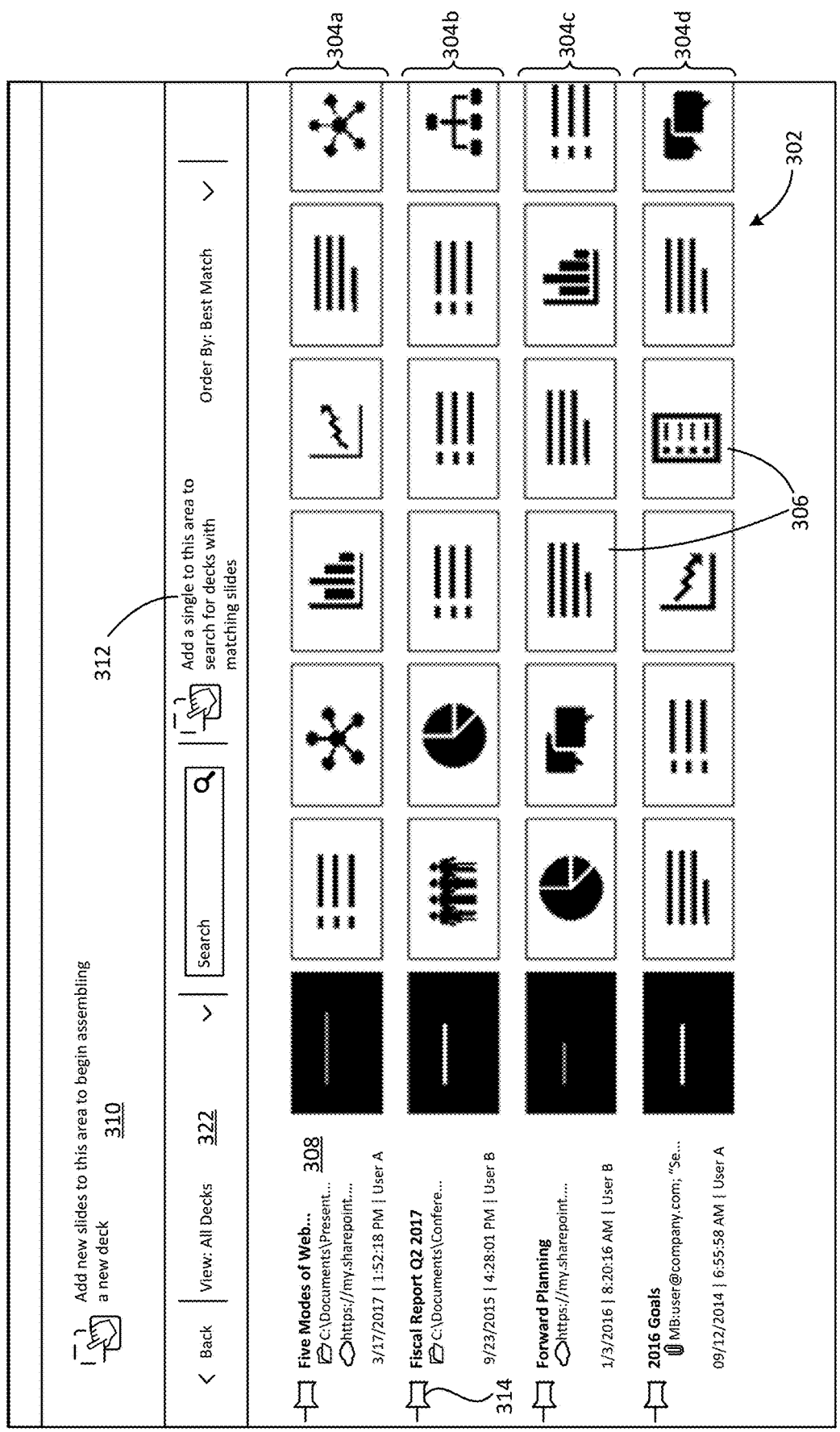
FIG. 3 shows an example of a filmstrip graphical user interface (GUI) for comparing slide decks.

FIG. 3 shows one example of a filmstrip GUI rendered by SlideScope, in which a plurality of slide decks is represented. Each of the slides decks is represented by a one-dimensional array (304*a-d*) of discrete (individually discernible), uniformly spaced cells 306, which are of substantially equal width and height in this example, thereby forming a two dimensional grid 302 in the example of FIG. 3 (each array being a row of the grid 302). Each row 304*a-d* ("filmstrip") represents one of the slide decks, and each cell 306 in that array (filmstrip segment) constitutes a display element representing an individual slide of that deck. That is, SlideScope displays decks in a filmstrip view, with one row per deck and one cell per slide. In this example, the rows run horizontally, with slides displayed from left to right in the order they appear in the slide deck (alternatively, each slide deck could be represented by a column of the grid 302 running vertically, for example). Thus, each filmstrip 304*a-d* representing a deck is formed of a sequence of discrete, uniform filmstrip segments with the sequences displayed alongside each other to allow a side-by-side comparison of the decks. For each filmstrip, every cell between the first and last slide is populated, i.e. every one of those cells represents an individual slide (or group of slides—see below), however the GUI is scrollable and this may not be the case once the user has scrolled to reach the start or end of one or more of the decks, depending on how they are aligned (see below).

Note: within a slide deck or across different slide decks being compared, slides may have different aspect ratios. In this case, the cells 306 may be different sizes to represent the different sized slides. The cells may still be uniformly spaced so that the cells 306 across the decks being compared remain vertically aligned, however this is not essential: the cells needn't be the same size (even within one filmstrip). When there's a match, SlideScope aligns the left edges of the matching slides, such that those slides align, and neighbouring slides are just drawn in the appropriate adjacent positions, and needn't align with anything at all in filmstrips above and below.

In the interests of conciseness, a filmstrip representing a deck is sometimes just referred to as a deck, and likewise sometimes the filmstrip segment representing a slide is just referred to as a slide. It will be clear in context what is being referred to.

Each filmstrip segment comprises a visual representation of the slide it represents. That is, a version of the slide is displayed within each filmstrip segment, so the user can see what each slide looks like. That is, image data of the slide itself is displayed to render the representation of the slide.

As shown on the left hand side, information 308 about each slide deck is displayed in association with the corresponding filmstrip. This can include, for example: a name of the slide deck, which can for example be derived from the file name or from its content, for example from a title slide, a location at where the deck is stored or other information about how it has been obtained (for example an address in local or remote storage, or an identifier of a mailbox and email where the deck is an email attachment, as for filmstrip 304d), and information about when the slide deck was created and/or edited, such as a time, date and user ID for the creating/editing user.

For email attachments, the GUI may also indicate whether those are sent or received attachments.

Duplicate decks, that is different decks (e.g. different files) for which all of the slides match, are not represented twice. Instead, duplicate decks are represented by a single filmstrip. That is, exact duplicate decks are "collapsed" into a single filmstrip. This may be conveyed to the user 102, for example by highlighting their different names and/or storage locations. By way of example, filmstrip 304a is shown to represent two duplicate decks, one in local storage 108a and one in remote storage 108b.

SlideScope collapses only identical decks in this way to avoid hiding any information from the user: if several instances of a file are bit-identical, one representation can be shown, along with information that this file exists in several locations, without any loss of information; if the files differ even slightly, they are not the same file, therefore the system needs to make it obvious to the user that they are not the same.

A somewhat comparable but nevertheless distinct concept is one of slide "neighbourhoods". Where SlideScope can identify a number of decks as being sufficiently similar, but not identical, (referred to herein as a "neighbourhood") it could compress their representation into a single row instead of taking up a large amount of the vertical screen space. This is made clear to the user, and preferably there is a UI option provided to collapse or un-collapse an identified neighbourhood, so that the user can still see all of the available information should he wish to do so. The sequence of display elements representing a collapsed neighbourhood, in the collapsed neighbourhood mode of the UI, occupies an area of the display that is less than the total area of the display occupied by the multiple sequences representing the multiple decks in that neighbourhood individually in the un-collapsed neighbourhood mode of the UI.

Neighbourhoods do incorporate the notion of fuzzy matching, and the collapsing of a set of decks into a neighbourhood is something the user would have more control of than identical files.

For example, if the user has identical copies of FileA_v1.pptx in locations X, Y, Z, and a similar copy of FileA_v2.pptx in X, with a different file FileB_v1.pptx in Y, then the UI would show filmstrips for FileA_v1, FileA_v2, FileB_v1 with an indication that the first of those has multiple instances. Neighbourhoods resulting from this would be FileA_v1+FileA_V2 and FileB_v1—i.e., a neighbourhood containing two files (not four) and one containing a single file. As will be readily apparent, this also applies to other document types.

A possible measure of deck similarity that can be used to identify a neighbourhood is the number of matching slides in those decks. One implication of this is that it gets a different set of matches to a whole document comparison—consider the following example: a document has "A" on one page/slide and "B" on another, and a second document has "AB" on one page. A whole document match would say that they are good matches since both documents contain "A" and "B" whereas a sub-document unit match would suggest otherwise, since the identical text does not appear on any individual slide/page.

In order to reuse slides, a creation area 310 of the GUI is provided, into which the user can "drag and drop" a slide from the filmstrips to create a new deck containing a copy of that slide. The user may be able to manually select multiple slides to drag into the creation area 310 simultaneously, e.g. by dragging over them with a cursor. Moreover, mechanisms are described below that allow a user to incorporate identified groups of multiple slides, such as runs, into a new or existing deck without having to select them manually.

Searching/Alignment in Filmstrip View

As noted, SlideScope allows a user to select a particular slide as an input for searching, and SlideScope will (a) select just those decks which contain that slide or a close visual match and (b) align the decks such that the best matching variants of that selected slide are aligned vertically. This view shows the selected content in context, highlighting the differences around it.

To this end, a search area 312 of the GUI is also provided, into which the user can drag and drop individual slides from the filmstrips in order to select that slide as a search input (target slide).

Figure 4A:
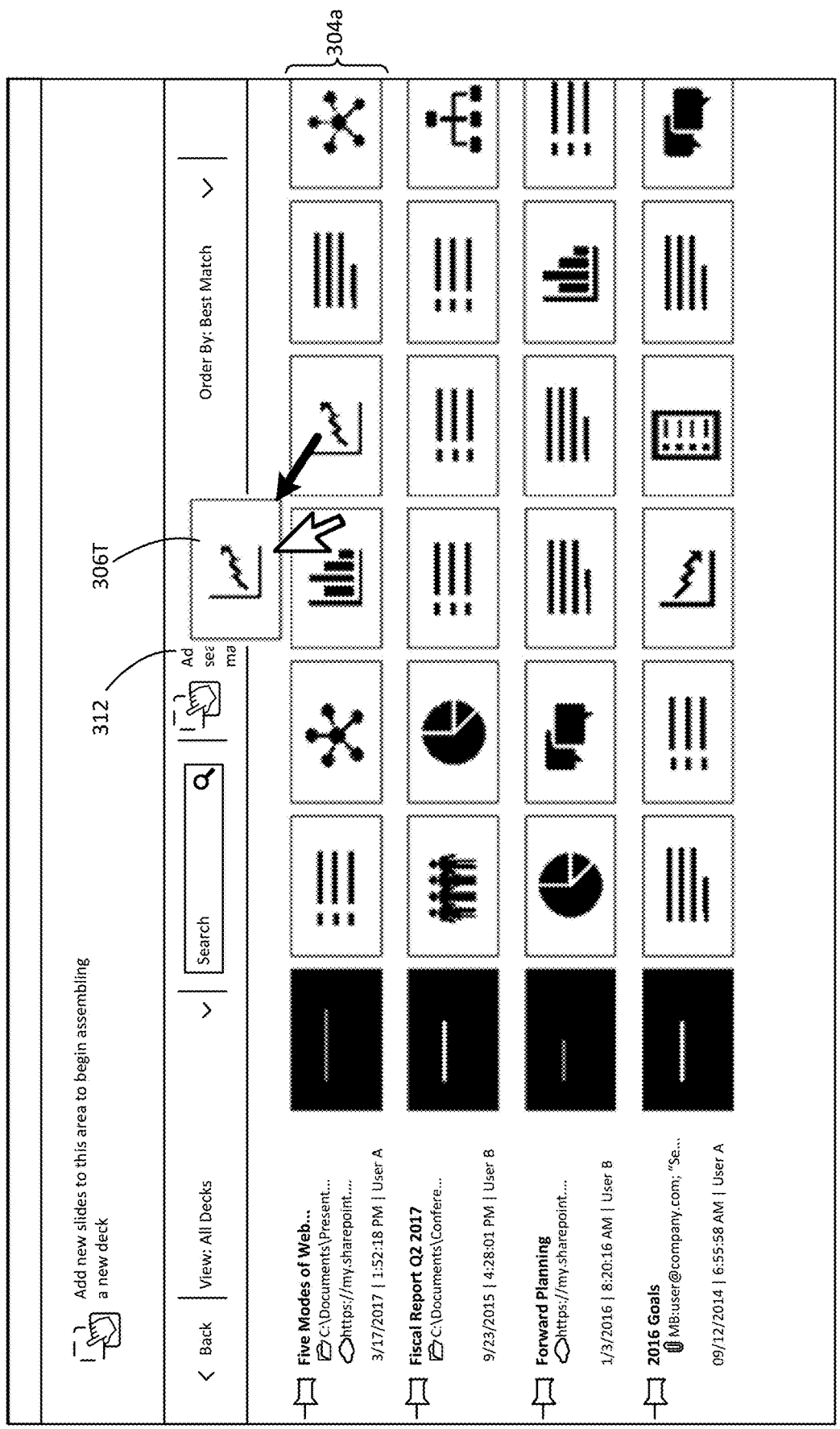
FIGS. 4A-B show examples of how a slide may be used as a basis for a search within the filmstrip GUI.
Figure 4B:
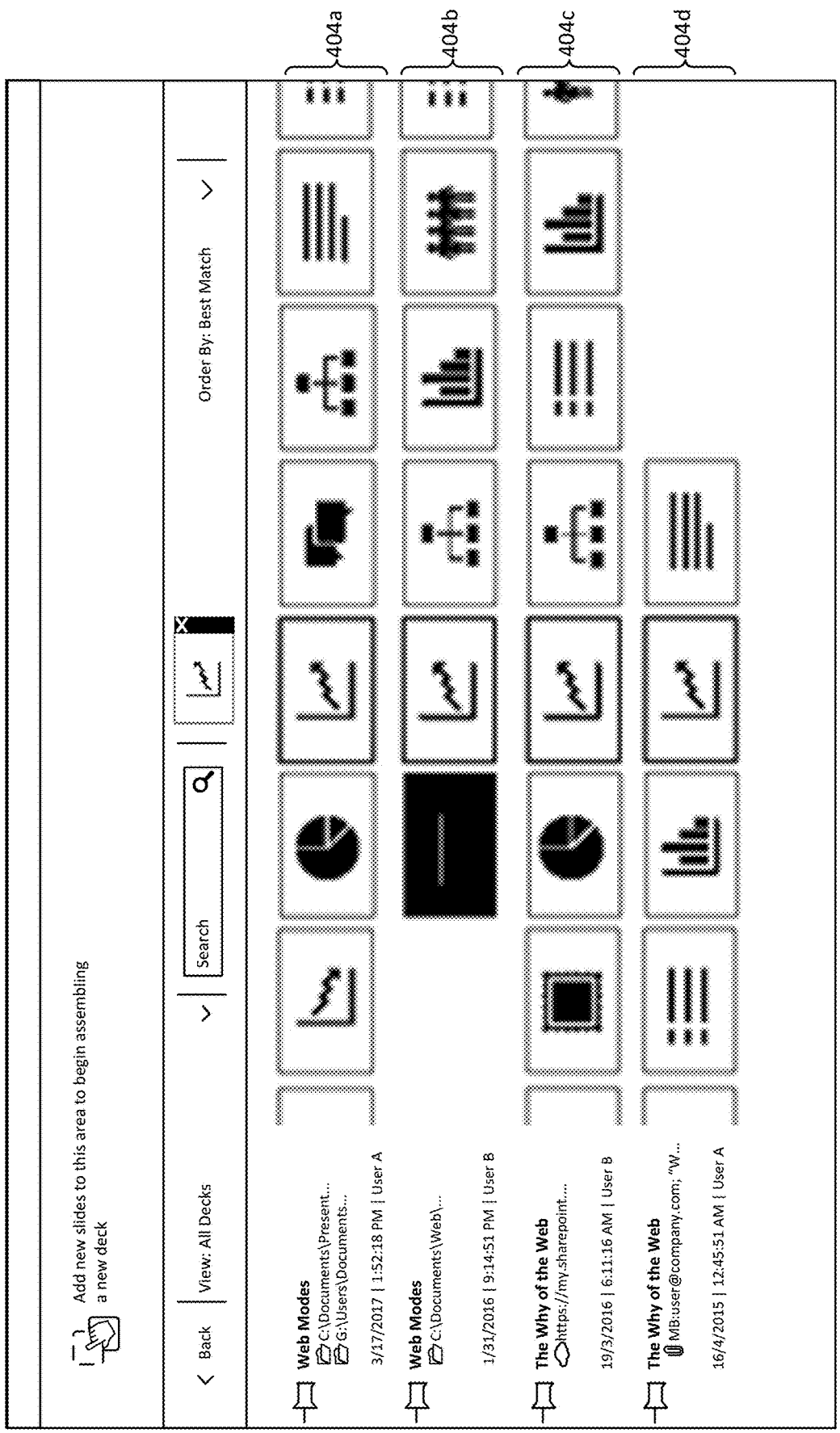

FIG. 4A shows an example, in which filmstrip segment 306T is dragged and dropped into the search area 312 to select the slide it represents as a target slide. As illustrated in FIG. 4B, this causes SlideScope to search for any other decks containing at least one matching slide. The results of the search are outputted as filmstrips 404a-d, wherein each filmstrip represents one deck determined to contain at least one matching slide. Decks that do not contain any matching slide are excluded from the search results. As shown in FIG. 4B, the filmstrip segments matching the target slide are vertically aligned.

Although not shown in FIG. 4B, the filmstrip 304a representing the deck from which the target slide was selected may also be displayed along with the search results for comparison, with the target slide 306T in filmstrip 304a being similarly aligned with the slides that match it. Indeed, this deck will simply be returned as a search result unless the system is configured to specifically exclude the deck containing the target slide from the search.

At any time, the user can select a different slide to instigate a new search, causing the GUI to be updated and realigned.

SlideScope also lets the user 102 provide other search parameters, such as an external source for the alignment operation, for example by providing a text string to search for an external image. This results in a similarly aligned display, which can be explored in the ways described above.

Decks that are excluded from the search results are not represented, with the exception that the user can "pin" a slide deck, by selecting an associated pin icon (314, FIG. 3) so that it remains on the GUI even if it does not match the current search parameters. However, these are not part of the search results, and may be visually distinguished from them on the GUI.

The user can scroll through the filmstrips to see different parts, and the alignment of the filmstrips is maintained as the user scrolls through.

As noted above, the user can nominate areas of storage on which SlideScope operates. SlideScope will only show decks from these nominated areas. An option 322 is provided in this example, via which the user can instigate a drop down menu to change the storage area nominations.

Multiple Matches

There may be multiple matching slides within a slide deck. SlideScope aligns to the best match but shows where others are, including indicating if there are matches off screen.

Figure 5A:
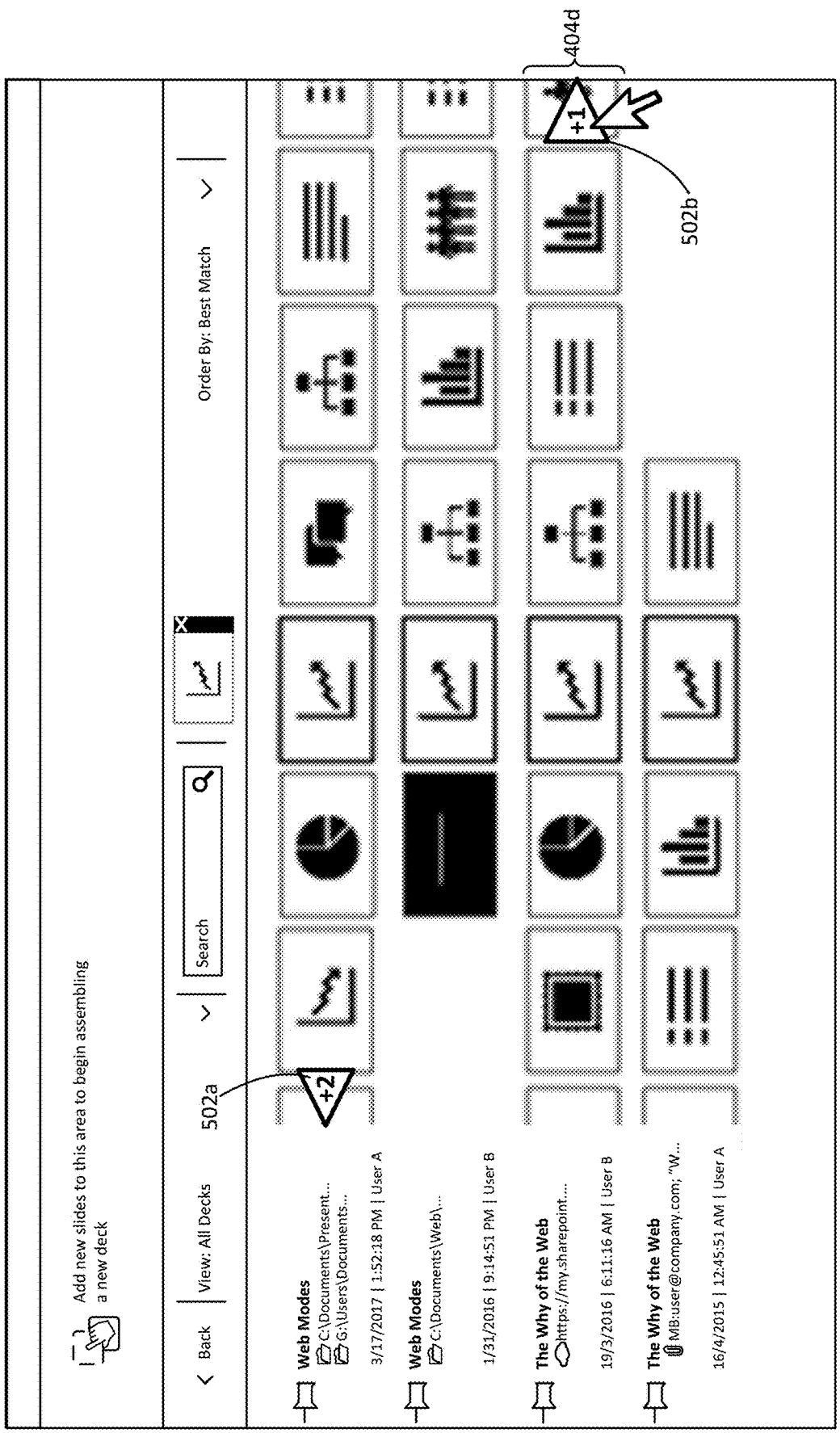

FIG. 5A illustrates an example of this, in which indicators 502*a*, 502*b* are displayed at or near the end of a filmstrip if there is a matching slide off screen, at the end of the filmstrip corresponding to the off-screen slide. That is, in order to convey the direction in which the user needs to scroll to locate the off-screen slide(s).

SlideScope may provide a re-alignment mechanism which lets the user hop to another one of these matches to show that in the context of the other decks. Each of the indicators 502*a*, 502*b* is selectable to automatically "hop" to e.g. the closest matching slide indicated by it, or to the next-best match.

Figure 5B:
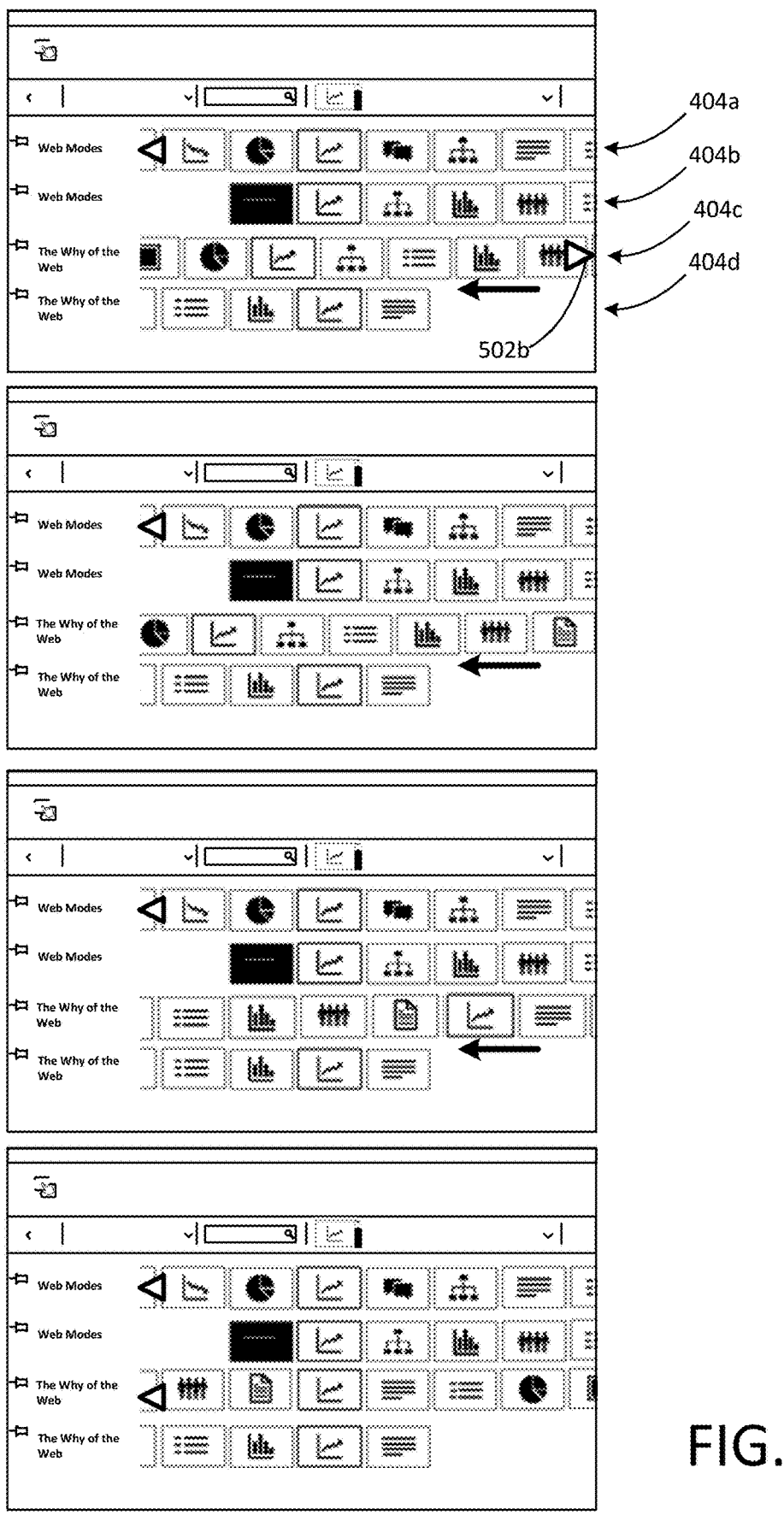

By way of example, FIG. 5B shows an example of a possible behaviour when indicator 502*b* at the right end of filmstrip 404*c* is selected. FIG. 5B shows the GUI at four different points in time as an animation effect is rendered in response, whereby filmstrip 404*c* moves horizontally from right to left relative to the other filmstrips 404*a*, 404*c*-*d*, until the next matching slide in filmstrip 404*c* becomes aligned with the matching slides of the remaining filmstrips. The animation may be helpful for the user in understanding the behaviour of the system, however it is not essential, and in this respect it is noted that references to "moving" a filmstrip relative to another filmstrip (or similar) do not necessarily imply animation—the filmstrip can be moved by changing the position of its cells relative to the cells of the other filmstrip instantaneously. This is also illustrated in FIG. 5C, in which the two matching slides in deck 404*c* are labelled 532 and 534 respectively. Slide 534 is initially at an off-screen location to the right of the UI and slide 532 is at an on-screen location aligned with the target slide. Selecting option 502*b* shifts deck 404*c* so as to align slide 534 with the target slide, which also causes slide 523 to move to an off-screen location to the left of the UI.

Runs in Filmstrip View

Figure 6A:
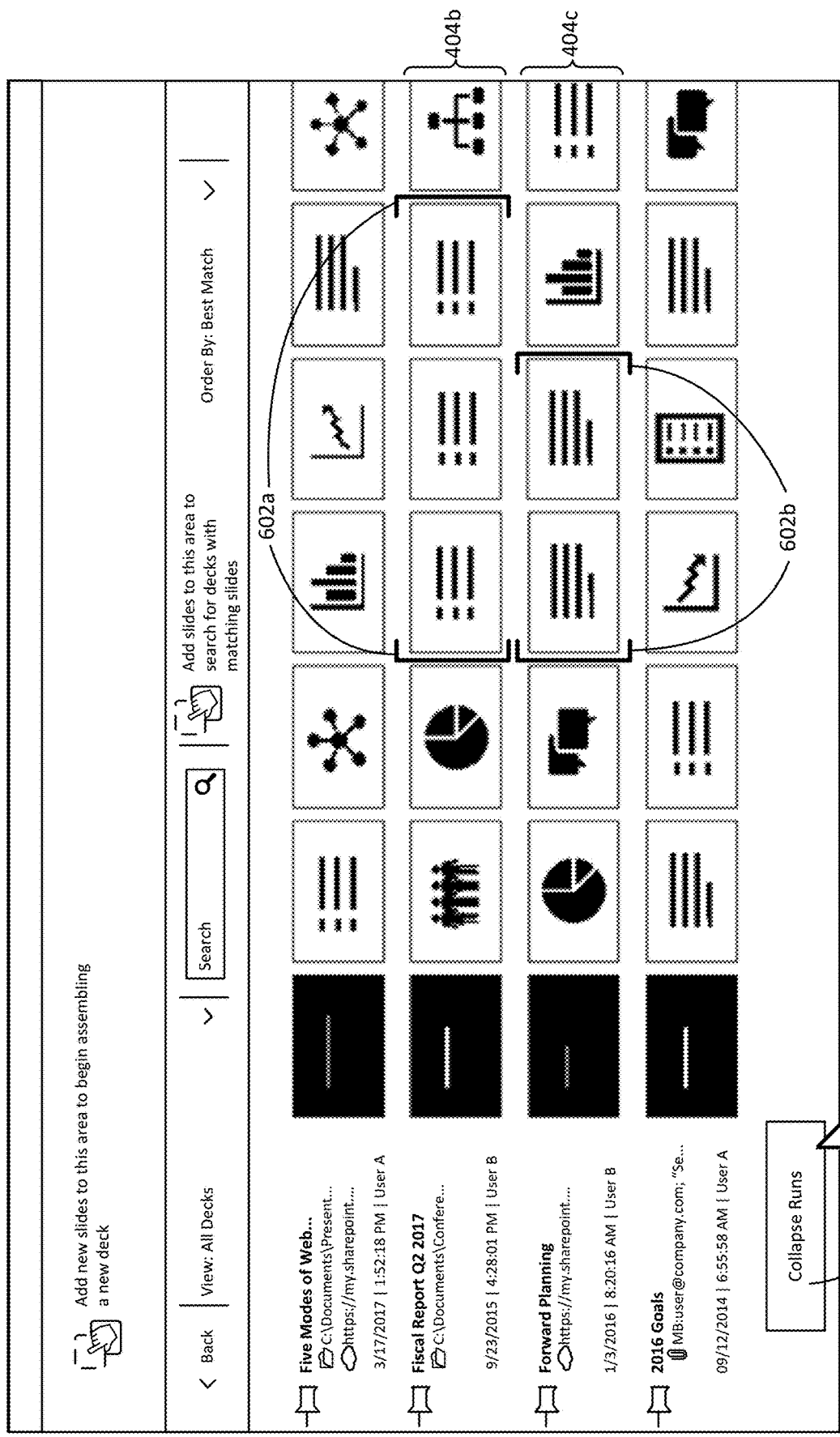
FIGS. 6A-C illustrate an example of how "runs" of related slides can be handled within the filmstrip GUI.

FIG. 6A shows an example of how identified runs of slides may be conveyed to the user in the filmstrips. In this example, a pair of run indicators 602*a* is displayed at the start and end of a three-slide run of filmstrip 404*b*. Likewise, a pair of run indicators 602*b* is displayed at the start and end of a two-slide run of filmstrip 404*c*.

Additionally, within each filmstrip, runs of slides can be "collapsed" such that each run is represented by one discrete filmstrip segment within the filmstrip. A selectable collapse option 604 is provided, which the user can use to switch from an un-collapsed group mode to a collapsed group mode. The display element representing a collapsed group, in the collapsed mode, occupies an area of the display that is less than the total area of the display occupied by the multiple display elements representing the multiple slides in that group individually in the un-collapsed mode.

Figure 6B:
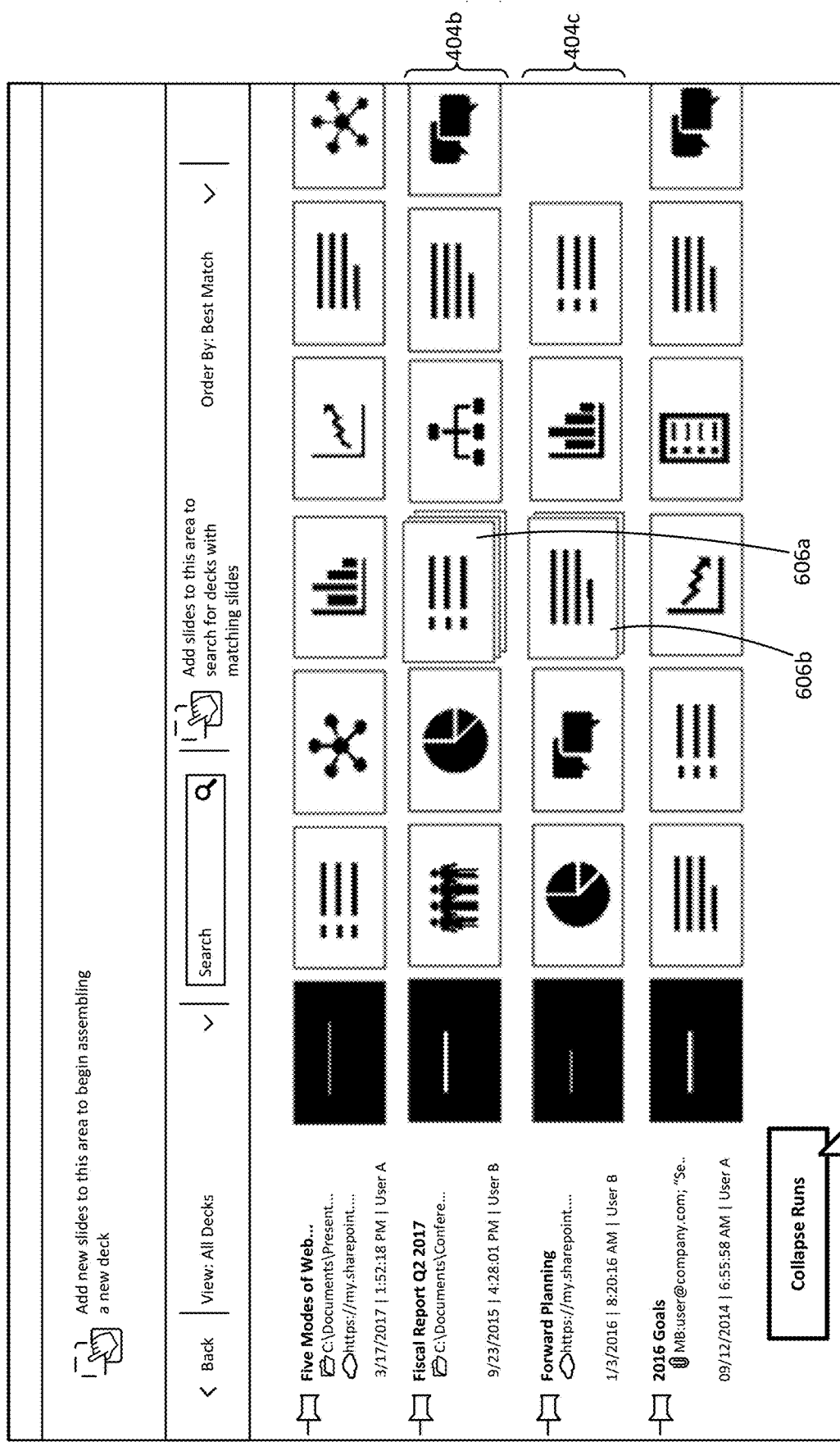

The collapsed run mode is shown in FIG. 6B. In the collapsed run mode, instead of being represented individually, each run is represented by a single filmstrip segment, such as filmstrip segments 606*a*, 606*b* representing the runs marked by run indicators 602*a* and 602*b* in FIG. 6A. That is, in the collapsed mode, the filmstrip segments represent a mixture of runs and individual slides that are not part of any identified run.

SlideScope also identifies runs (see section 3, below) using a number of techniques, including approximate co-occurrence across multiple decks (i.e., finding sequences which are similar in a number of data streams), and allows these runs to be collapsed, letting the user focus more easily on the unique content in slide decks.

Collapsing runs in this way allows more slides to be shown in the same space—as the slides after the collapsed run are effectively shifted towards the collapsed run—with minimal loss of information to the user, because the slides that are collapsed have related content. Collapsing runs is also intuitive, because the aim of run detection is to detect slides that the user is likely to use together, and therefore regard those slides in one sense as a single unit rather than individual slides.

Figure 6C:
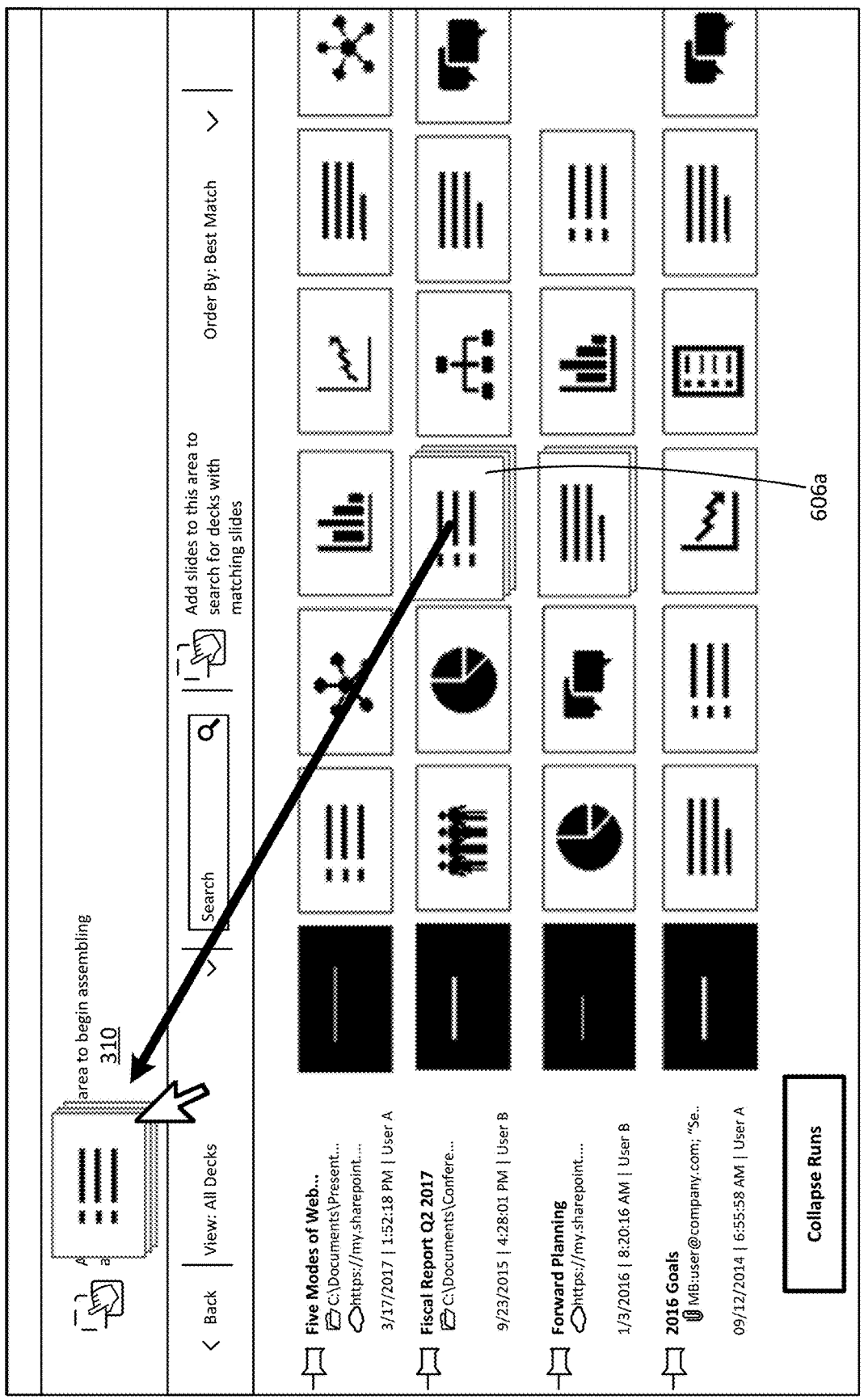

The user is also more likely to want to incorporate an identified run of slides into a new or existing deck in one go and, when creating new decks, a run can be copied across as easily as a single slide. As illustrated in FIG. 6C, a run of multiple slides can be selected in order to manipulate that run as a whole, without the user having to manually select the individual slides in the run. For example, the user can drag a segment representing a run, such as segment 606*a*, into the deck creation area 310 to create a new deck containing a copy of that run. The user can also easily import a copy of the run via the document editor 124, into a deck that is currently open for editing in the document editor 124. Examples of importing slides via the document editor 124 are described later.

Runs are collapsed to the first slide in the run. That is, a version of the first slide in the run is displayed within the filmstrip segment representing the run. Alternatively, SlideScope could instead use a slide it determines to be the most salient slide in the run (the slide with the richest content, for example), or (space permitting) it could depict multiple slides of the run within the segment, by reducing the size of each individual slide depiction.

All runs may be collapsed simultaneously (an "all or none" approach), with a possible exception that, if there's a match in progress, matching slides that would be hidden by being collapsed, would not be collapsed. That is, runs containing a slide(s) that matches the current target slide may not be collapsed.

Alternatively, runs could be collapsed selectively. For example, each run could be individually collapsible via the UI. This may be a separate UI option that is provided in addition to an option to collapse/un-collapse all runs.

Pinning Slides

Figure 7:
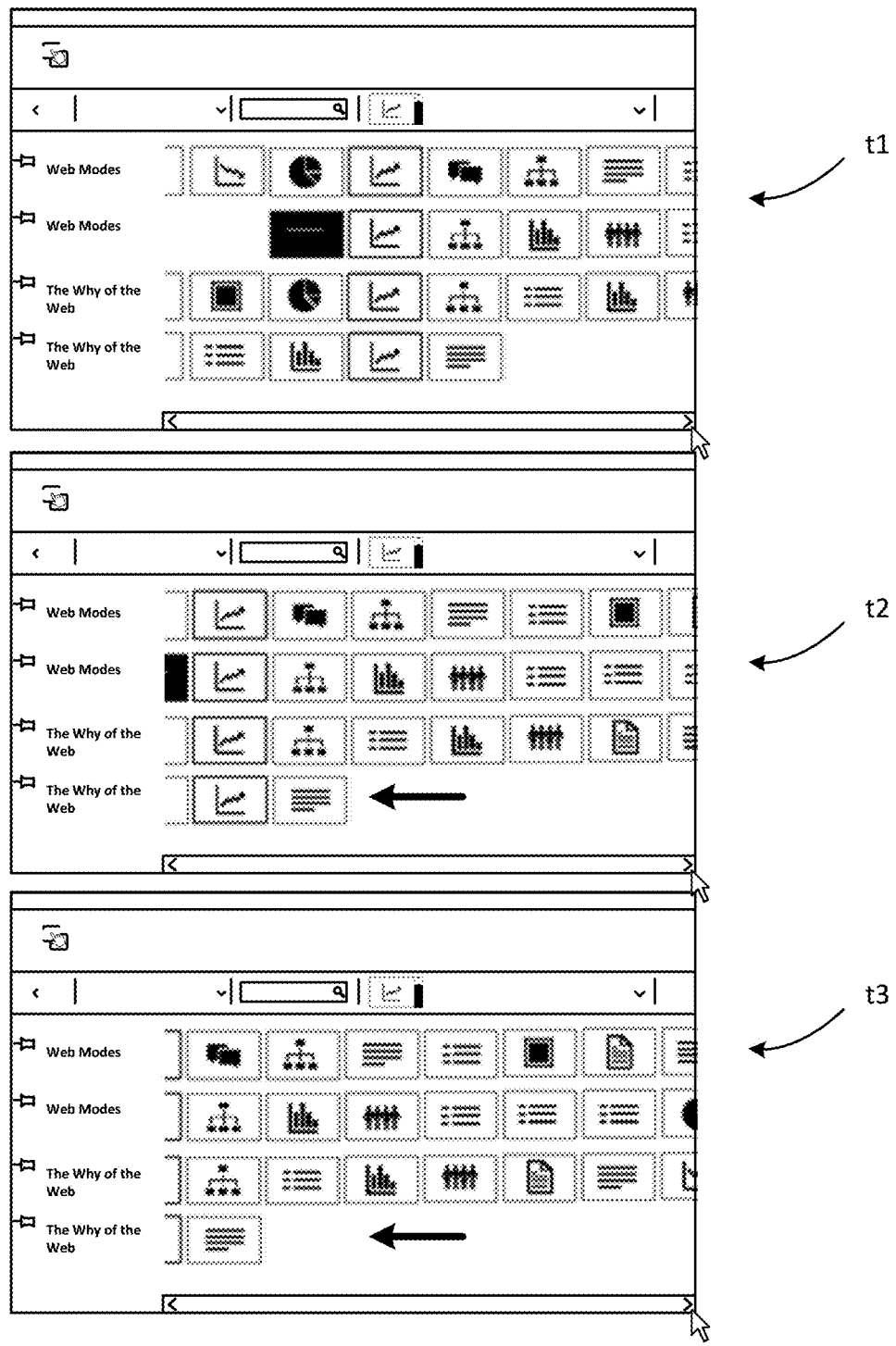
FIG. 7 illustrates an example of how the filmstrip GUI can intelligently response to scroll actions, as a user scrolls though the slide decks.
Figure 7:
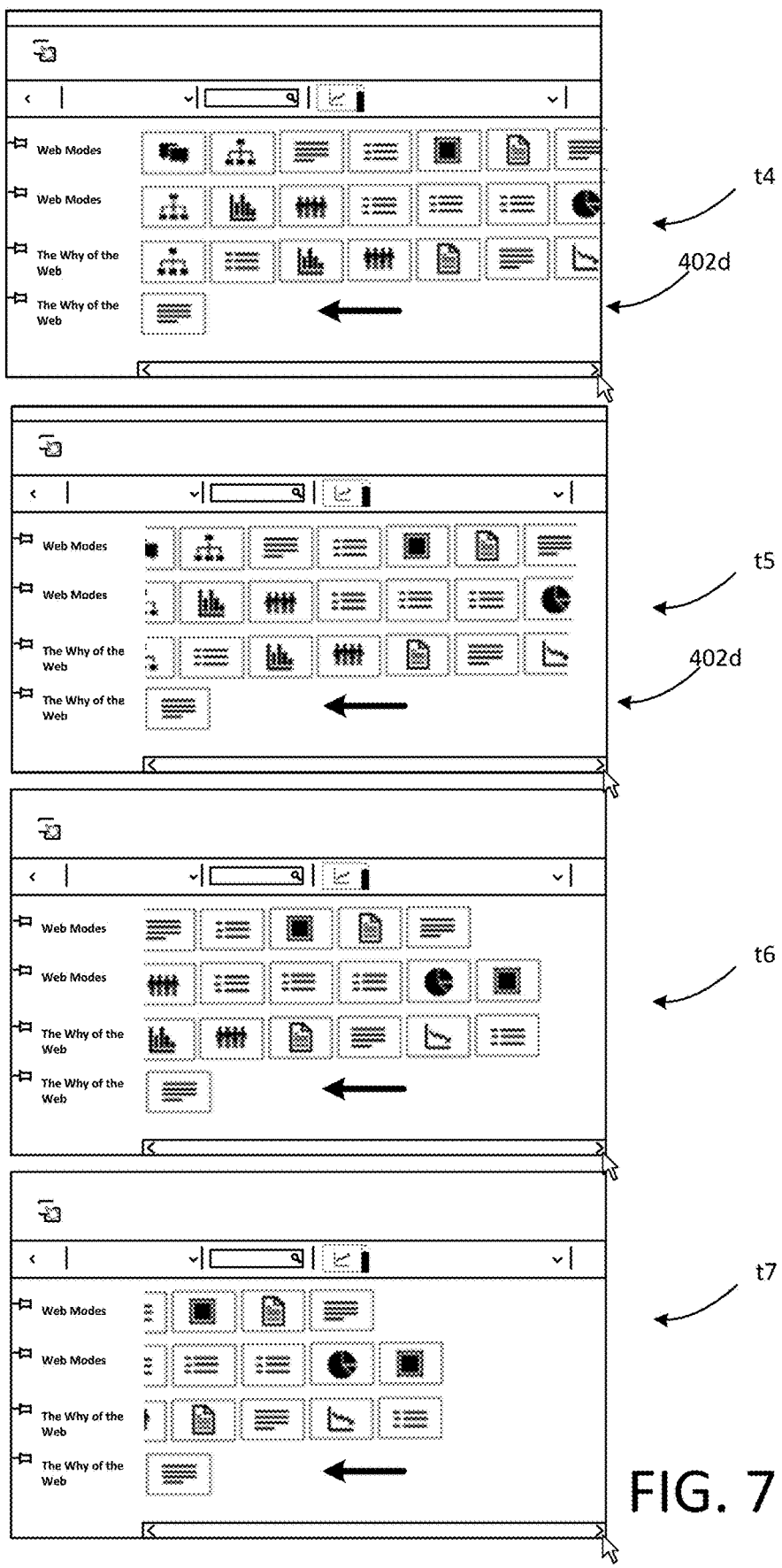

FIG. 7 shows another feature of the filmstrip GUI, which is that as the user scrolls through the slide decks far enough that he reaches the end of one of the filmstrips (corresponding to the last slide of that deck), rather than allowing the last slide in the deck to go off-screen as the user continues to scroll, the filmstrip segment representing the last slide is pinned.

FIG. 7 shows how the GUI changes over time in response to this scroll action, i.e. as the user scrolls towards the end of the filmstrips. Deck 402d is the shortest deck, and hence the user reaches the end of this one first. The views at times t1-t3 show the GUI before the end is reached, and the end is reached at time t4 such that only the last slide is visible. As the user continues to scroll though the remaining slide decks (times t5-t7), the last slide of deck 402d remains pinned (i.e. visible) on the GUI, rather than moving off-screen. This is helpful for the user in keeping track of the slide decks, because it means every slide deck is visually represented.

Slides are aligned based on at least one alignment criterion, which is at least one matching criterion in the above examples. The matching criterion can be applied to the content of the slides and/or any associated metadata. This can be metadata that is derived from the content, or existing metadata that forms part of the slide decks, such as structural information, timing information, slide type etc.

For example, the system could align slide decks based on slide type (rather than content) or heading level 1 in a Word or HTML document. Another example is a log trace—the system could align by timestamp rather than log message content, for example.

Other alignment criteria can also be used, for example if the document elements are paragraphs and have variable sized display elements, the system could align based on paragraph number.

3. Identifying Runs and Other Groups

SlideScope implements various run (or other group) detection heuristics, such as visual comparison elements and cross-document comparison.

Rich document formats tend to encode structural information within their data files, to be exploited by the appropriate document editors. For example, Word offers a wide range of heading and other style types, which users can employ to describe the document structure somewhat independently of the contents of the document. However, there also tend to be less formal structural elements in many documents which are not currently exploited by editing and viewing applications. As examples, slide decks may include short groups of tightly coupled slides (two pages of a list too long for a single slide; or a complex diagram built up over several slides), or might have appendix slides which are associated with particular slides or groups of slides within the main body of the deck.

Identification of these groupings can help with reusing content from one document to another, and can simplify display of and navigation within the document.

SlideScope can detect these structural elements by a combination of signals ranging from structure/style labels within the document, text matching heuristics, visual comparisons, and combinations of these across a corpus of similar/related documents.

Reusing content across documents involves locating and then carefully selecting the desired content first. When SlideScope identifies coherent chunks of content it can (a) bring these to the fore to simplify the location task and (b) automatically select the appropriate bit of content, which may be non-contiguous.

Existing document editors do offer some level of structure definition, e.g., sections, paragraphs, diagram element grouping, and the editor can typically offer quick selection of that unit (e.g., triple click to select a paragraph) as well as some form of compact structure outline display (e.g., slide sorter, or Word's document outline). However, these are tightly coupled to the formal document structure and can't be used flexibly to detect evolving informal groupings.

SlideScope has a number of mechanisms for detecting contiguous runs, as described below. Any of these can be used individually or in combination to determine runs statistically, for example to generate a match score for each pair of slides as described above. A subset of slides can be identified as belonging to the same group when their match scores with respect to each other are above a similarity threshold, for example. This similarity threshold can be lower than the matching threshold used to locate matching slides for the purposes of searching.

Identified groupings are embodied as grouping data generated by SlideScope. This can be generated on-the-fly, and may not persist. For example, the grouping memory can be transient data that is only generated in the processor's memory, without having to store it to disk (i.e. externally). It could be stored externally if desired for later use, but this is not essential.

Use of Structure Information

If a user has defined a section, or used section/title slide formats, it can label the first slide in the section or the first slide after the section/title slide as the start of a run.

Use of Textual Heuristics

If slides have titles and the text of those titles has significant overlap (e.g., title starts with the same subset of words, or has a number followed by the same words, such as "Findings 1" "Findings 2" "Findings (cont)"), SlideScope can designate these as a run.

Overlapping text/objects—if successive slides share a large number of the same element, regardless of styling (e.g., a bullet list which is expanded by a new element on successive slides, or a diagram which has pieces added while others fade into the background, or use of the "morph" animation in recent PowerPoint versions), SlideScope can associate those slides into a run.

Visual Comparisons

Similar images across slides can also indicate runs. Visual comparison can be done in a number of ways, using the same or similar techniques that are used to identify matching slides across different decks.

For example, by discarding the top and bottom 10% of a slide (on the assumption that these are likely locations for header and footer information which is irrelevant), and producing a fingerprint of the remainder which is compared with all other slides in the same deck to produce a match score. Alternatives include stripping all styles (removing backgrounds, reducing all text to the same typeface, removing colours from diagrams, etc.) and then producing the fingerprints; or normalising the size of diagrams or images on slides such that the same figure represented in different locations/sizes on different slides will be recognised as the same.

Comparison Across Decks

SlideScope can apply slide comparisons across a corpus of decks and can identify slides which are commonly used, and moreover used together, and those selections can be identified as runs. That is, by inferring that sides have related content from the fact that they are used together in multiple decks. Note that, although the comparison may involve comparing slides across decks (as well as slides within decks), it is performed to group slides within individual decks.

Learned Groupings

In some implementations the user may also modify the autonomously-derived groupings, and the group detection component 206 may learn from the user's changes to improve future grouping. More generally, SlideScope can learn from how a user groups slides together manually in order to better predict future grouping that the user might make, i.e. to predict the user's behaviour. This is a form of unsupervised learning.

Supervised learning may also be used to learn the user's preferences regarding slide groupings. For example, in a training phase, the user could be shown a random or predetermined selection of slides and asked to group them. SlideScope learns from the user's groupings, in order to predict future groupings when the system becomes "live". These may be "dummy" slides, or real slides taken from the user's decks.

For example, a neural network (or other machine learning model) may be trained to predict slide groupings.

Note that the run definitions may have some "fuzziness" in their definition. For example, in the cross-deck matching, it may be that a run in one deck has an extra slide compared to the "same" run in others but, because they share many of the same slides, they can be seen as different variants of the same run.

As noted, in some implementation, SlideScope determines a type of the slide—if a slide is very text heavy, with no or few images, SlideScope can (a) apply a (fuzzy) text match for that slide and (b) compare it only with other text heavy slides; whereas if a slide has little text, SlideScope can apply a visual match and only with other text-light slides. In some implementations, one or more additional comparison modes may be provided, e.g. another mode for line diagrams or tables, or a mode in which animations or videos are broken down to compare and match their constituent frames. A heuristic match which weights the different measures could be used generally, for example by giving more weight to text-based searching for text heavy slides, and more weight to visual matching for text-light slides.

The cross-deck comparisons are partly an attempt to reveal the authors' previous actions on decks he/she creates. For example, detection of the same/similar set of slides across several decks is an indication that the user did in fact copy those slides from one deck to the other. Editing tools could be augmented to show this reuse directly, thus giving stronger evidence of runs/related slides than SlideScope's autonomous inferences. This reuse could be directly encoded within the document file formats to make it easier to recover—e.g., each slide could have a globally unique identifier, with an additional field indicating which other slide it was copied from.

Where a title slide appears immediately adjacent to a series of slides identified as having related content, SlideScope may identify the title slides and the related slides as a run. That is, it may assume the title slide is also part of the run, grouping the title slide in with the slides having related content. Another possibility is that a section start slide found within a usage-defined run could be used to split that run into two separate runs.

A slide or other document component may be part of more than one group. For example, they system could implement overlapping or nested runs. For example, where a run is split as above, this could result in a run containing two nested runs resulting from the split.

Enforced Runs

Another use case for runs (or other groups) is the notion of "enforced" runs. For example, a user may allow another user to use a set of slides, but with the proviso that certain runs or groups of slides can only be used together, and individual slides cannot be removed from that group. This could be used, for example, to ensure that slides are not selectively removed from a group in a way that creates a misleading message (e.g. to prevent the removal of slides that might have unfavourable statistics, or some other scenario where the removal of slides form the group would constitute a "lie of omission").

Less rigid group enforcement could also be used to make it harder for a user to unintentionally remove slides from a group, e.g. by accidentally deleting them, though the user may be able to override this.

For example, when a user attempts to delete a slide within the document editor interface, SlideScope may determine that the slide is part of a group, and either block the deletion (rigid enforcement), or output a warning that the slide is part of an identified group, and request that the user confirms that they do indeed want to delete this slide.

A group can contain a single slide in certain circumstances. For example, the system can apply a rule that all section header slides will form the start of a run, but if two section heads are adjacent, the first would be a run of a single slide. However, the nature of the grouping is such that a group can contain multiple slides, and in practice most groups will contain multiple slides.

4. Slide Re-Use Prediction

Based on knowledge of slide co-occurrence across multiple decks, when someone reuses existing slides, SlideScope can offer suggestions for the next slide/slides they may want to use. The suggestions are not limited to slides, but could suggest content elements, or references to other data sources.

People often create new slide decks from old and, when they reuse slides, they often take them in groups rather than singly. By providing a form of "auto complete" for slides, SlideScope makes reuse quicker and easier.

Various example interfaces via which slides can be suggested will now be described.

SlideScope harnesses some of the same logic that is used to align matching slides to a target slide in the filmstrip view in order to intelligently suggest slides.

Figure 8:
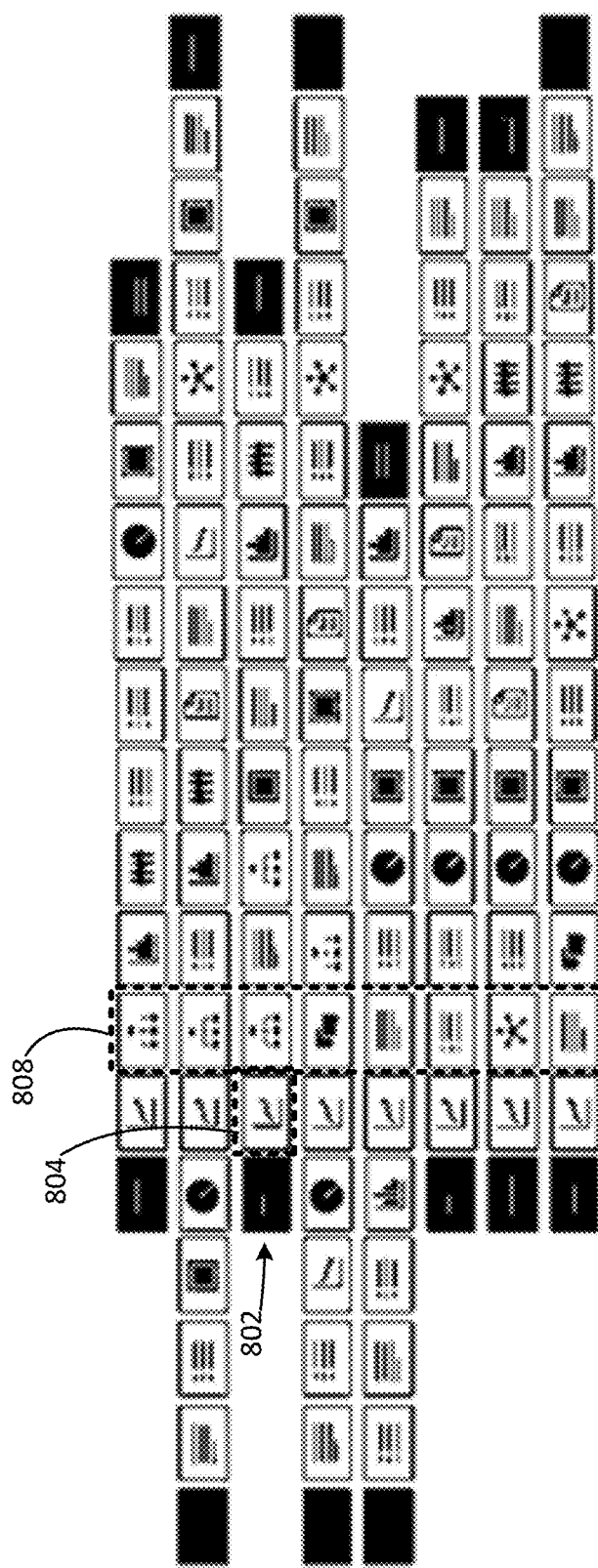
FIG. 8 illustrates certain principles underlying a slide suggestion function.

This is illustrated conceptually in FIG. 8, which illustrates the principles underlying SlideScope's recommendation mechanism. SlideScope initially computes a similarity measure between every slide in decks designated by the user (e.g., all decks within a certain store/folder), in the manner described above.

Based on this, given a target slide 804 (existing or new) in a current deck 802, it first finds all other slides similar to it and, from there, all slides 808 which were used next in decks 806 containing the matching slides (shown aligned with the target slide 804 in FIG. 8 for ease of reference). It then clusters those slides 808 on the basis of their similarity and presents an ordered list of candidate slides which the user may want to insert after the target slide 804.

"Clustering" in this context means collapsing duplicate (or very similar) slides within that list, so that SlideScope doesn't show multiple copies of the same slide because the user happens to have used that particular pairing in multiple previous decks. The slides remaining in the list are ordered by popularity. More sophisticated processing could look at more than just the current slide (e.g., see what slide typically follows the current and previous slide—a shorter list than using just the current slide, but one that might be a stronger predictor). Slide prediction could also make use of artificial intelligence (AI) techniques, for example by training a slide prediction model using a corpus of slides decks.

FIGS. 9A-E show a first example of how the SlideScope GUI can operate to suggest slides. In this example, the SlideScope functions are accessed via a first region of the GUI 902, which is displayed alongside a second region of the GUI 904 via which the standard functions of the document editor 124 are accessed, corresponding to different regions of the display 112.

Figure 9A:
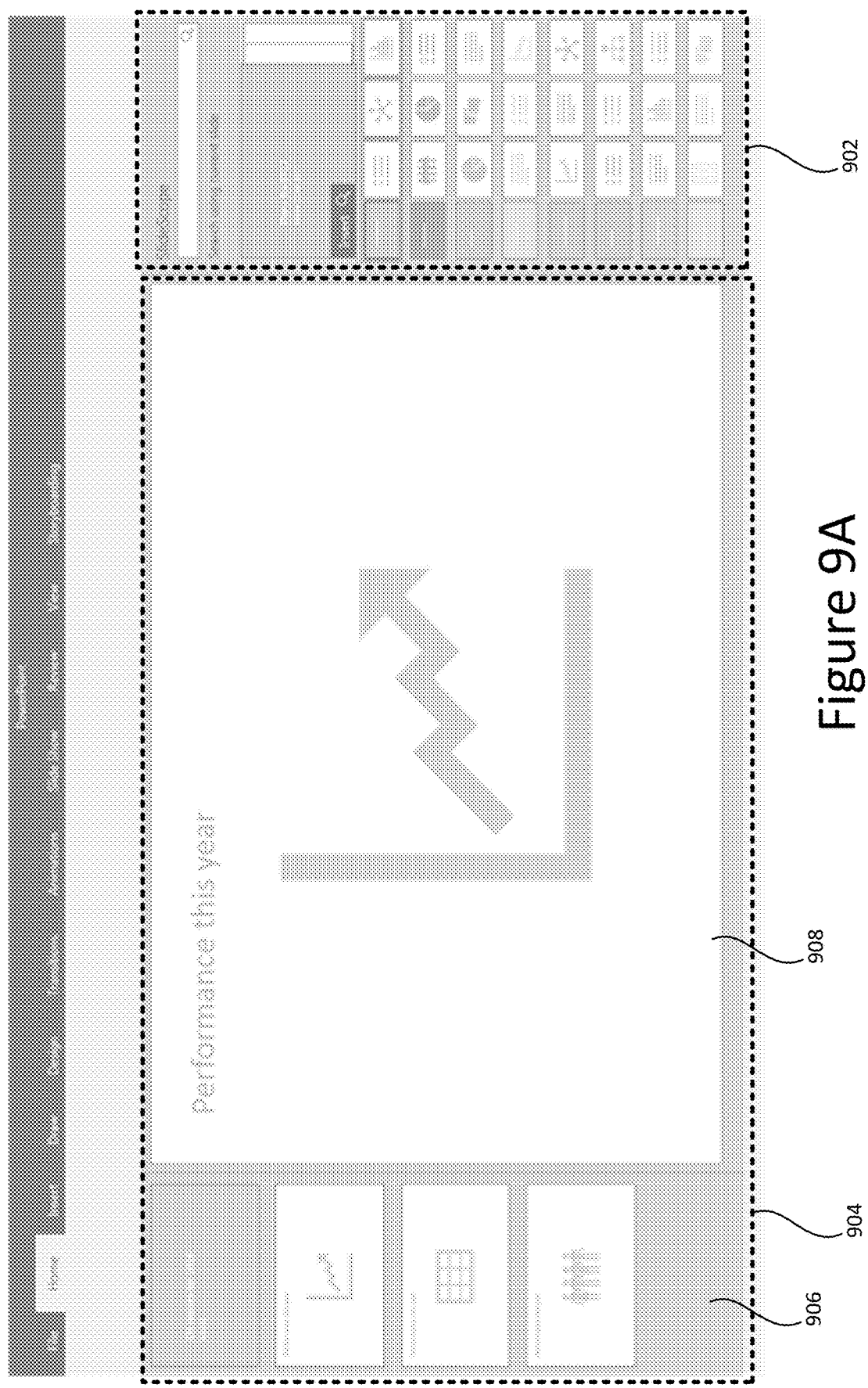
FIG. 9A-E illustrate a first example of a slide suggestion GUI.

In FIG. 9A, a presentation is shown as currently open within an editing environment provided by the document editor 124. Within the document editor region 904, the sequence of slides of the current presentation (or at least a subsequence thereof) is represented, using a "thumbnail" image to represent each slide, in a sidebar region 906. The slide that is currently being edited is represented over a larger area 908. Within the SlideScope GUI 902, the user can request SlideScope to provide suggested slides to follow the current slide. This request can be made in a number of different ways, depending on the implementation, for example by selecting an option within the SlideScope GUI region 902 for suggestions based on the current slide, or by dragging and dropping the current slide (e.g. its thumbnail image) into the SlideScope region etc. This triggers the SlideScope operations described below. Alternatively, suggestions for slides to follow the current slide can be made automatically, in which case these options can be triggered automatically by the user, say, selecting the current slide for editing within the document editor region 904.

Figure 9B:
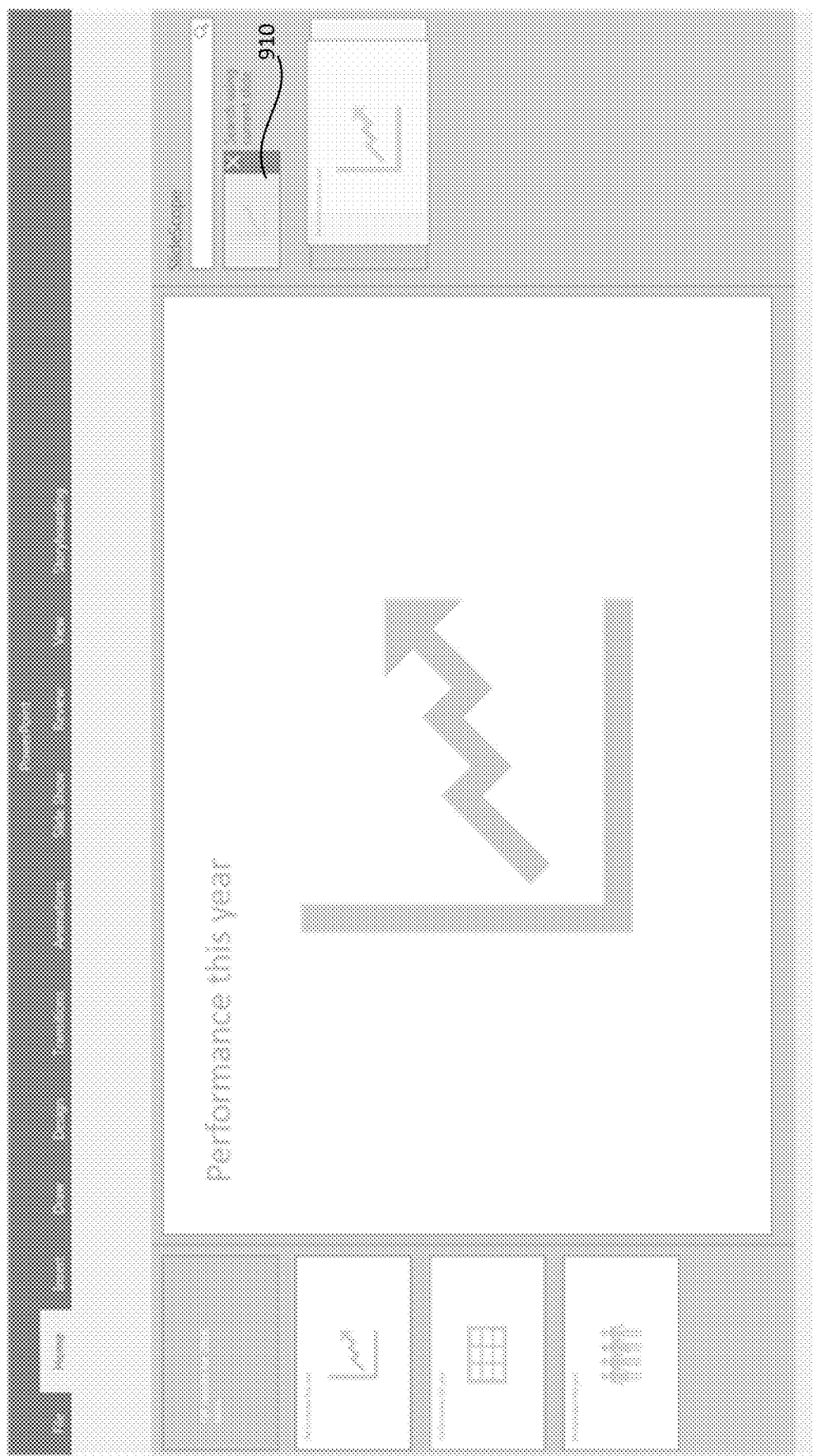

FIG. 9B shows an example in which the user has selected the current slide, causing a visual representation 910 of the current slide to be rendered in the SlideScope region 910 to convey that it has been selected successfully.

Figure 9C:
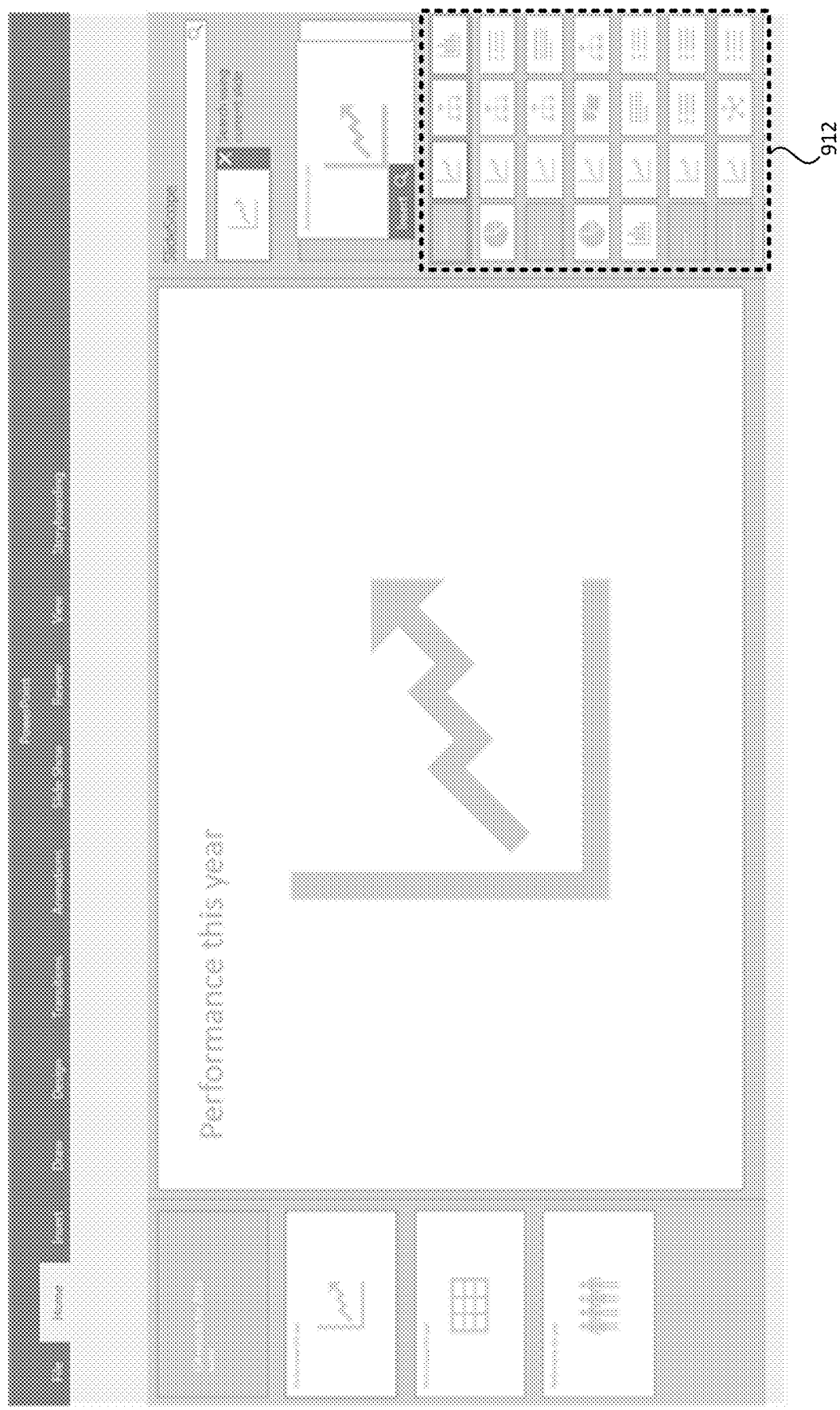

As shown in FIG. 9C, this causes SlideScope to display suggested slides for the current slide, which are chosen by SlideScope as described above. In this example, the slides are suggested in a sub-region 912 of the SlideScope region 902. In this example, a truncated version of the filmstrip view as described above is used to present the slides: each of the decks containing a suggested slide is represented as a filmstrip, where the filmstrips are aligned on the matching slides, i.e. along one vertical column of the grid, such that the next slides in the decks are all shown in the following columns.

Figure 9D:
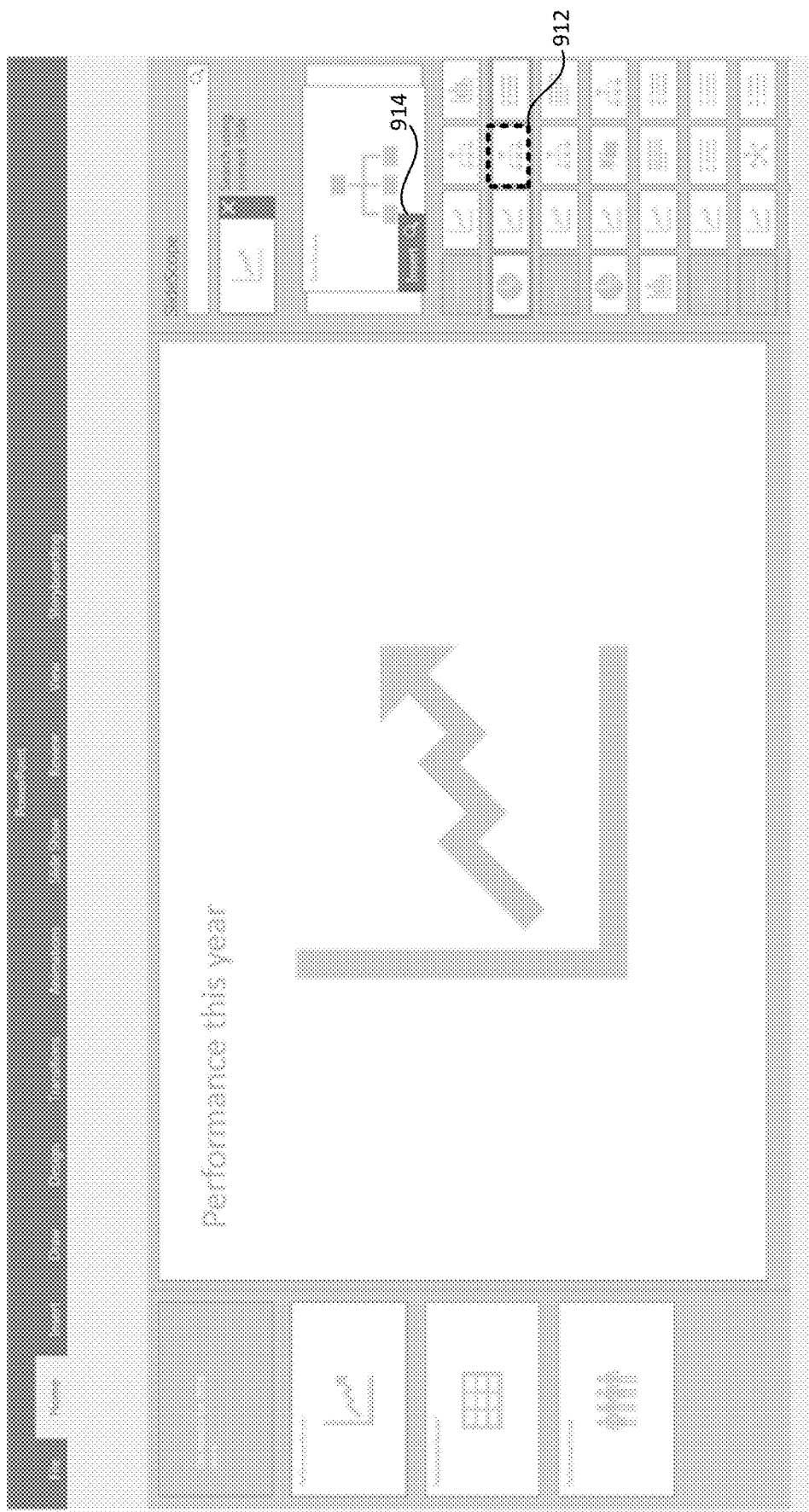

As shown in FIG. 9D, the user can then select one of these slides by selecting the corresponding filmstrip segment (913 in this example), and a selectable option 914 is provided to insert this slide in to the deck being edited. Alternatively, it could be incorporated from SlideScope via any suitable user input means, such as drag and drop etc.

Figure 9E:
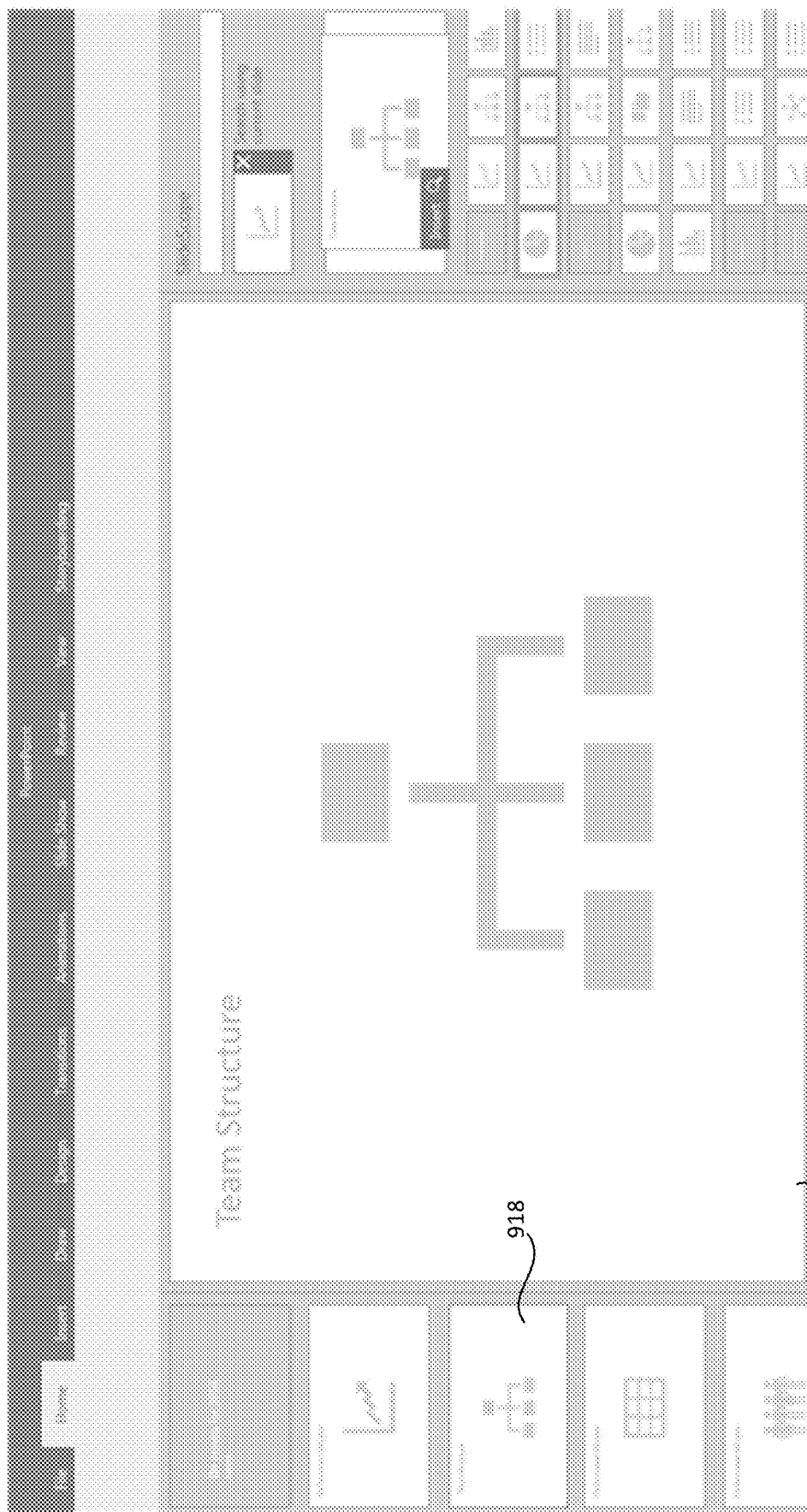

FIG. 9E shows the GUI after this option 913 has been selected. The selected slide has now been inserted into the deck being edited after the target slide, causing a thumbnail image 918 of that slide to be added to the thumbnail representation at the corresponding position in the sequence. The newly inserted slide is also now represented within the editing area 908 of the document editor, via which it can be edited as the user sees fit.

When a slide is inserted in an existing deck from another deck, it could be a version of the slide with styling to match the destination deck, or it could bring along its own master/background/style (i.e. its original styling may be maintained).

In this first example, the SlideScope filmstrip interface cooperates with the document editor interface to make intelligent suggestions. This first example can be thus seen as a use case of SlideScope's filmstrip view functionality, to provide intelligent suggestions whilst a deck is being edited.

A second example will now be described with reference to FIGS. 10A-E, in which the slide suggestion functions are more closely integrated with the document editor GUI.

Figure 10A:
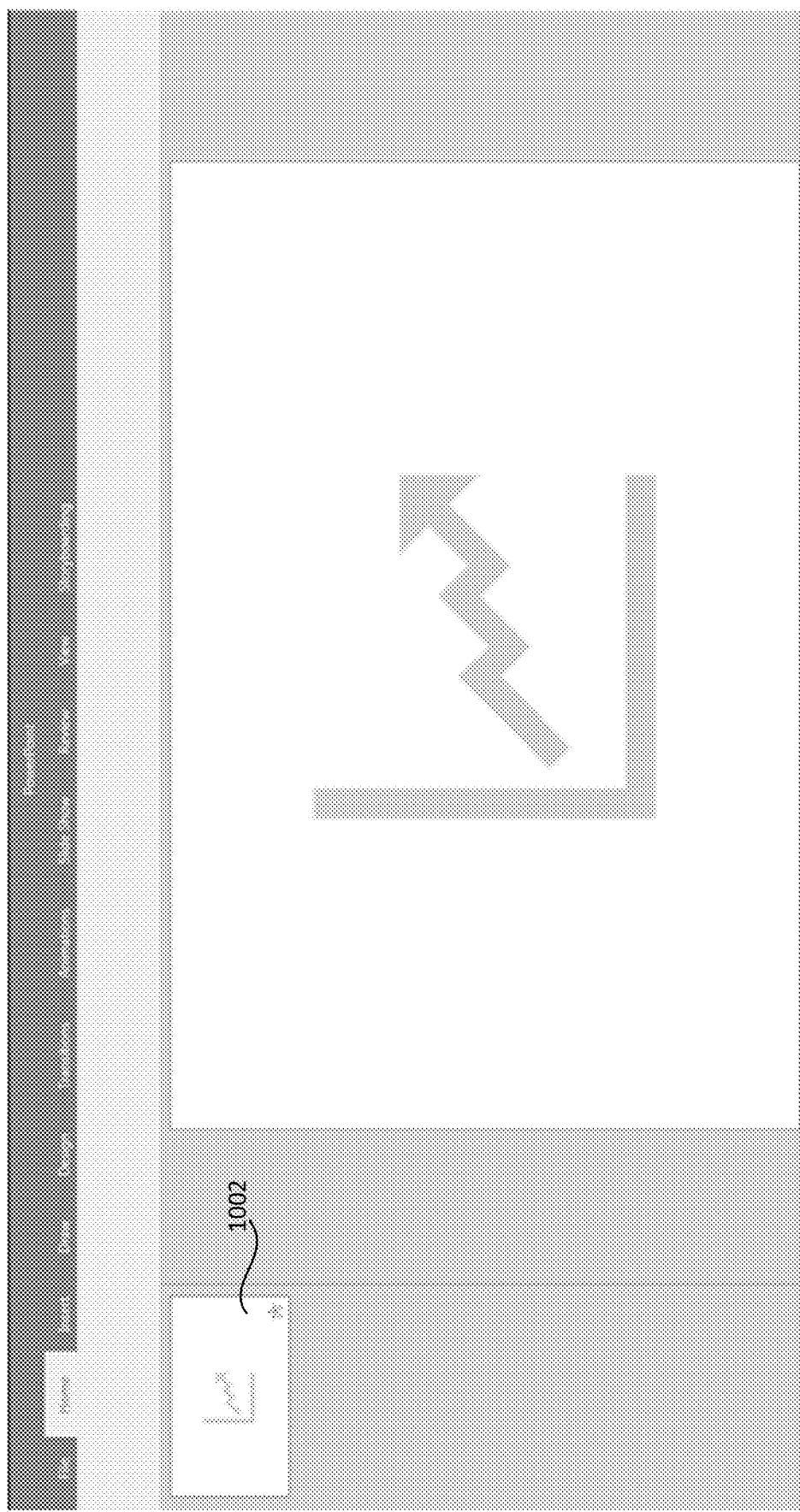
FIGS. 10A-E illustrate a second example of a slide suggestion GUI.
Figure 10B:
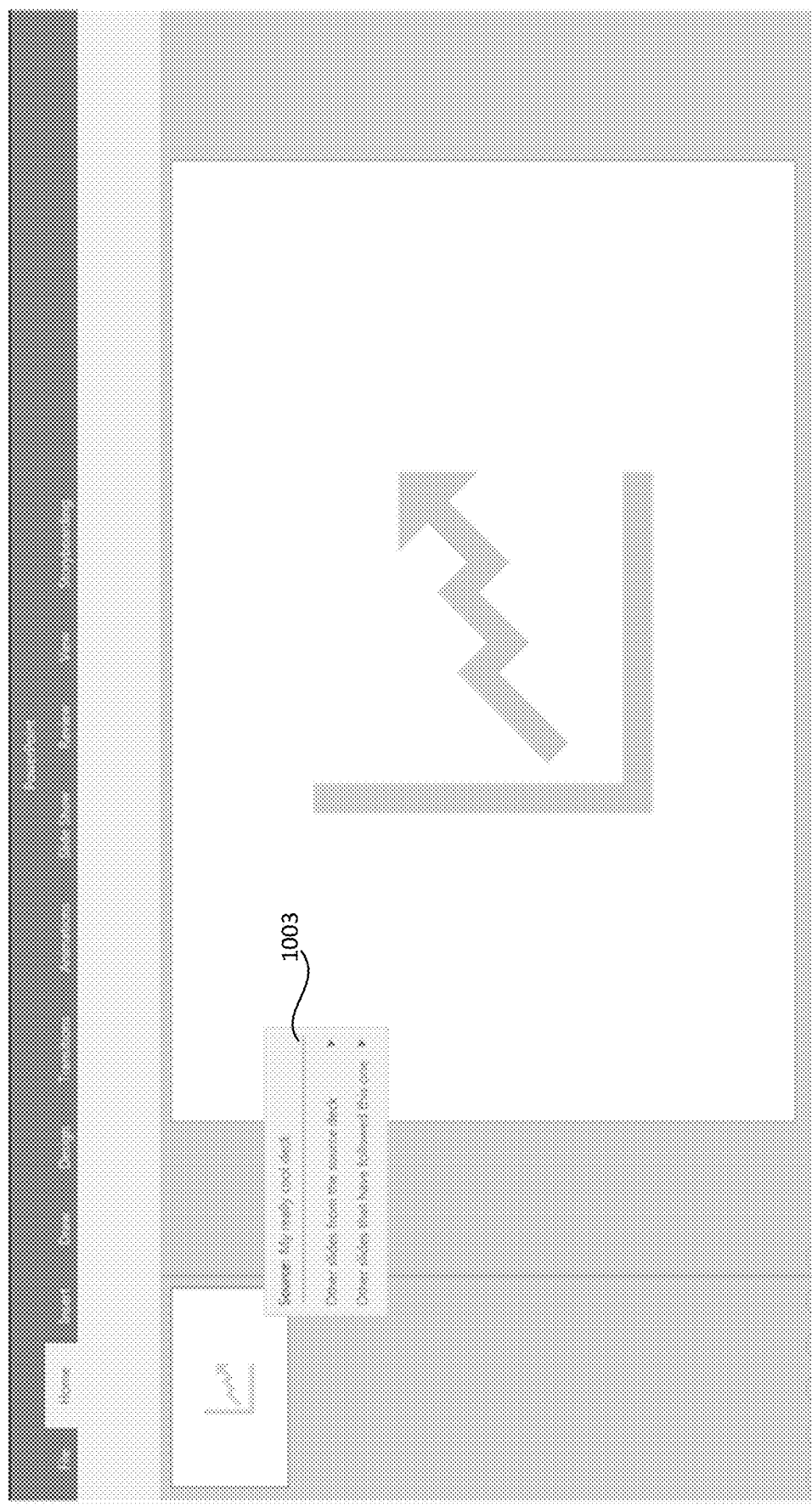
Figure 10C:
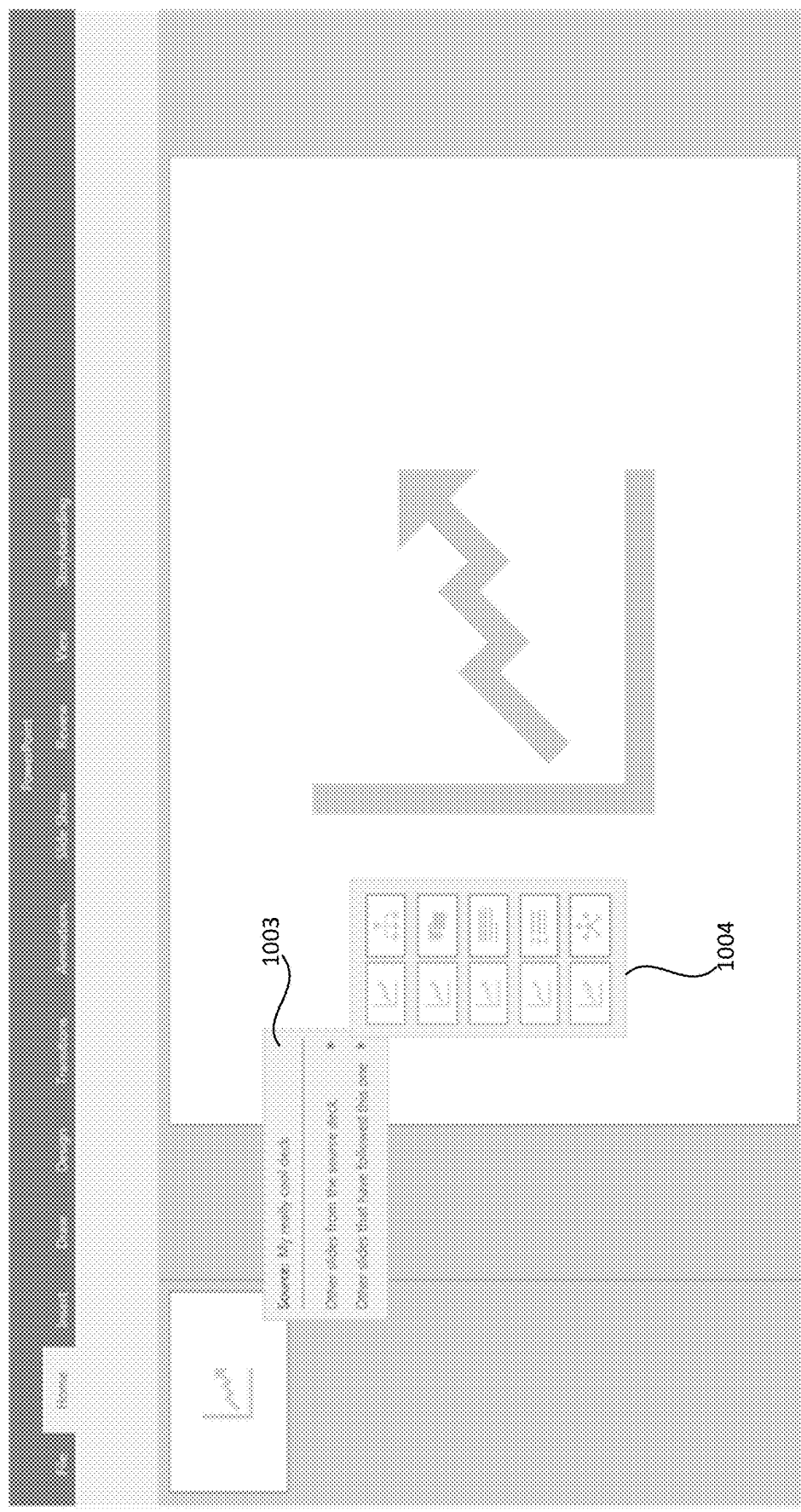
Figure 10D:
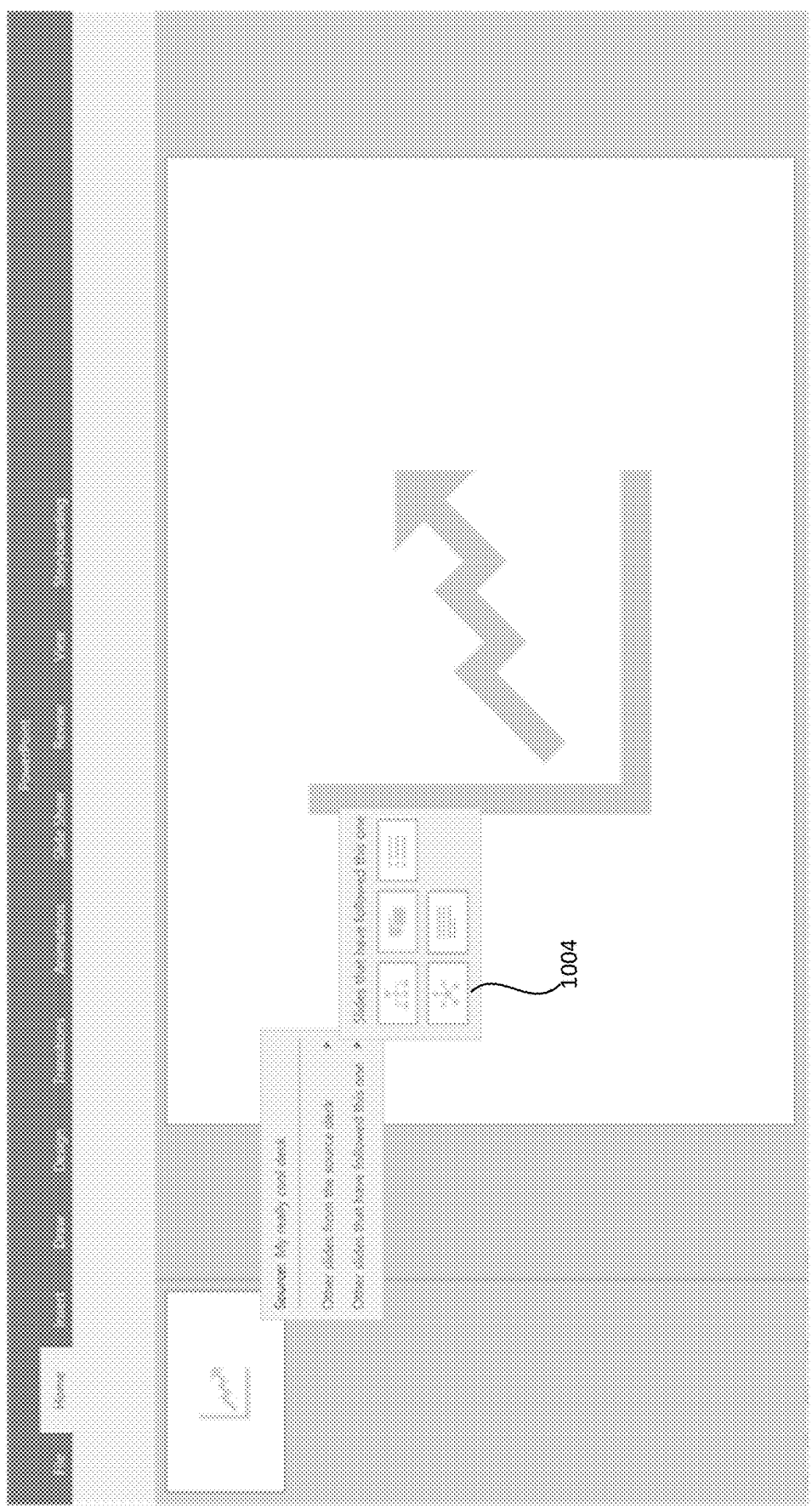

FIG. 10A shows a slide being edited within the document editor interface, as before. As shown in FIG. 10B, the user can instigate a drop-down menu 1003, for example by right clicking on a thumbnail representation 1002 of the current slide or with some other suitable user input action. From the drop down menu 1003, as shown in FIG. 10C, he can navigate to a list 1004 of suggested slides for the current slide, where each element of the list constitutes a displayed suggestion that the user is free to accept or ignore. To provide context, each of these is shown in association with the slide that was found to match the current slide, to provide context for the suggestion (i.e. so the user can understand which it is being suggested)—essentially providing a two-cell long "snapshot" of the filmstrip view. Alternatively, as shown in FIG. 10D, only the suggested slides may be shown. In any event, the user can select one of the suggested slides in the list to incorporate it in the current slide deck, thereby accepting the suggestion for that slide.

Figure 10E:
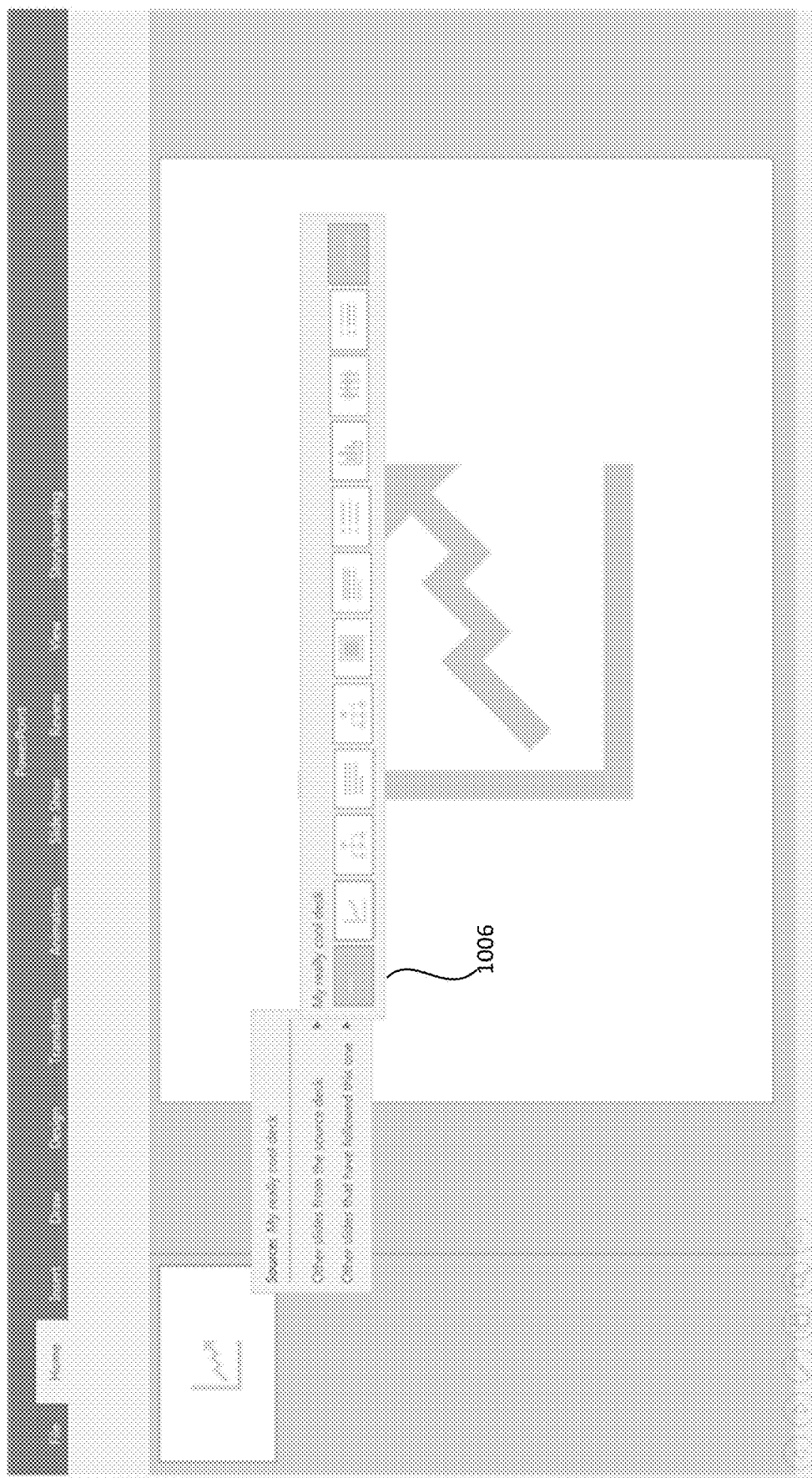

As shown in FIG. 10E, where the current slide has been copied from another deck, the user may also be able to navigate to a list 1006 of slides from the deck from which it has been copied, which again the user can select to incorporate in the current version.

These ideas can be extended to include runs such that SlideScope can suggest runs to include as well as individual slides, or it can use the fact that the current slide is part of a run to increase the strength of the prediction of the other slides in the run.

Predictions can be extended further than a single slide, or backwards as well as forwards; or the system can use additional structural/heuristic information from a slide deck to boost the prediction scores for, e.g., section headers.

For example, whilst in the above predictions are made based on a single slide, they could be made from multiple slides. This could be used, for example, to tune the prediction ordering by taking into account (say) not only the current slide but also one or more previous slide as well (or some other group of slides chosen for whatever reason) and take that sub-sequence as the query to search the other decks (e.g., deck 1 contains A, B, C, and deck 2 B, C, D, deck 3 A, C, F; if B, C are used as the query, D comes back as a much stronger response than F).

That is, the basic premise—i.e. given a target slide, finding matching slides in other decks and then locating slides in those other decks that are associated with the matching slides within those other decks—can be extended to other types of associations, e.g. based on the positions of those slides relative to one another in the sequence in question, their content (in particular, whether they have related content) or a combination of both.

For example, in the above, slides are suggested when they are the next slide after a matching slide, such that predictions are based on a fixed offset of one. However, in alternative implantations, some heuristics/machine learning could vary the offset. An example might be that a simple prediction would indicate a slide that is blank and the prediction algorithm would skip that slide and suggest the following one instead. In this respect, the system looks for slides at a target offset which can be predetermined (fixed at one in the above examples, i.e. it always looks for the next slide) or variable and determined dynamically. This can also be extended to other types of target positional relationship, which may be predetermined or determined dynamically in this manner.

If the user chooses to accept a suggestion to insert a slide from another deck, a copy of the suggested slide(s) is inserted into the deck being edited in a way that matches the positional relationship between the (original) suggested slide in the other deck with respect to the target slide in the deck being edited. The system determines the position at which the slide is inserted automatically (without the user having to specify this position) based on the position of the target slide in the deck being edited. This determination can be a basic computation whereby the computer system simply adds a copy of the suggested slide as the next side after the target slide. For more complex positional relationships, this could involve more complex calculations by the computer system in order to match this positional relationship.

The dataset containing slide co-occurrences could include other (meta)data, which could also be surfaced in the predictions: references to source documents, or people, for example.

In some implementations, SlideScope filters out of the candidate prediction list all slides which match content already in the deck being assembled, so as to avoid recommending slides that are essentially duplicates of slides already in the deck. Filtered-out slides are not suggested for insertion in the document the user is working on.

Figure 11:
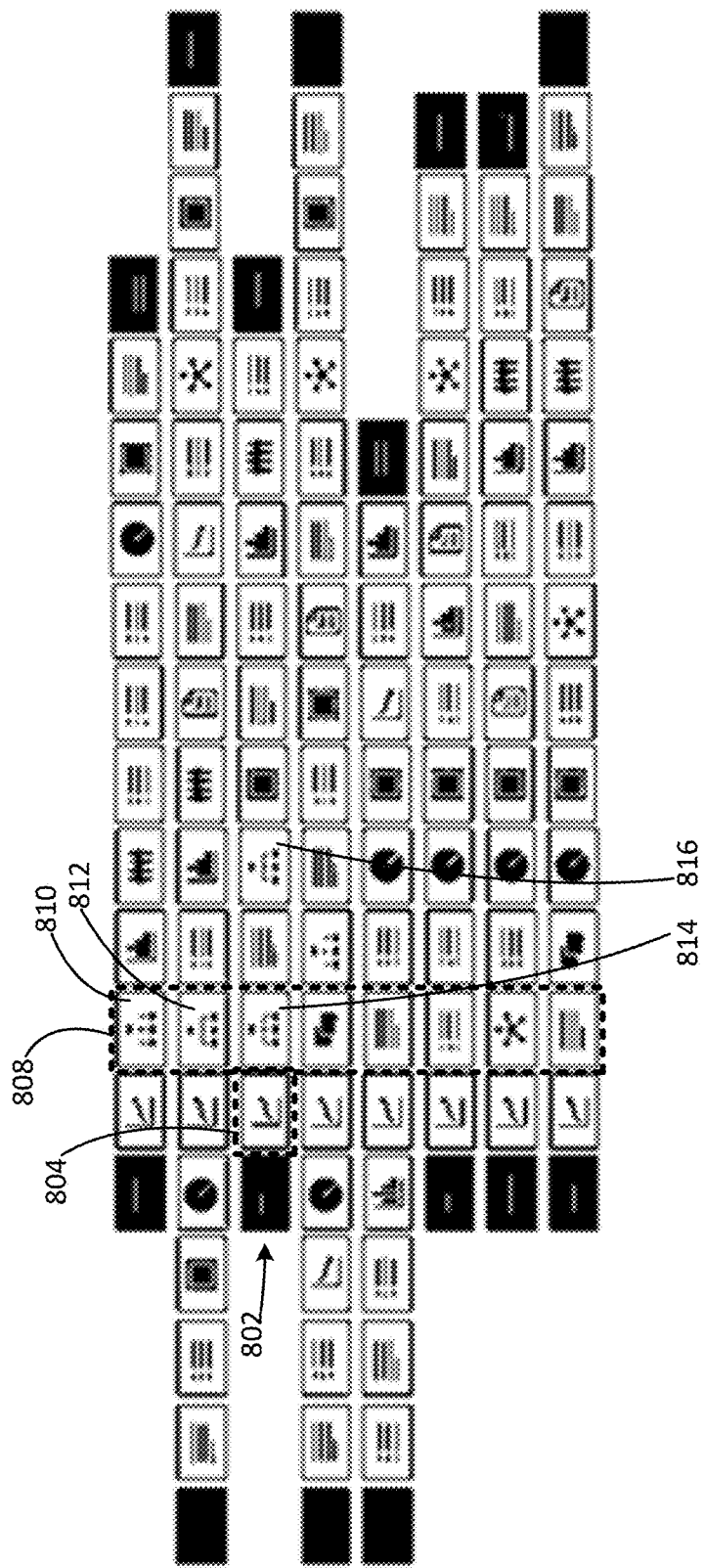
FIG. 11 illustrates certain principles behind filtering a set of suggested slides.

By way of example, in FIG. 11 (which corresponds to FIG. 8 described above) the slides labelled 810 and 812 might be filtered out by SlideScope because the current deck 802 already contains matching slides 816.

SlideScope can also convey the confidence it has that the user will select a particular slide. For example, where a suggestion has been derived via a slide that very closely matches the current slide, the suggested slide may be represented in a larger area of the display. That is, each suggested slide may be represented in a region of the display that has a size that depends on a confidence value associated with that slide, such that slides the system is more confident the user will want to select are represented in larger areas. The confidence value can for example be the matching measure between the target slide and the matching slide, or a value derived from it.

In the above examples, slide suggestion is built on single slide search, although it is a separate operation. It is however possible to implement automated slide suggestion in other ways. For example, SlideScope could simply suggest the n+1th slide from all of a user's previous decks when the user wants to insert a slide after the nth in the currently edited deck (e.g., when the user starts a new deck, it shows him all the first slides in previous decks; he inserts one of those, and it shows him all the second slides in response, regardless of context). That is, slides could be suggested for insertion based simply on their positions in their respective sequences relate to the target slide in the sequence of the current deck.

Suggestions may be suppressed occasionally when appropriate. For example, run detection may indicate that the current slide is the end of a run (at least in some decks) and not predict a next slide (from those decks) because this is the end of a part of a "story".

A "zeroth" slide prediction mechanism may also be provided—when a user creates a brand new empty slide deck, the system could suggest the most popular of his slides (or perhaps just his starting slides) as the first one to insert. It could even derive some dynamic template from an analysis of his slide decks to suggest a set of preferred slides.

The user may be able to specify some other signal—e.g., a neighbourhood of interest—and the system could supply a first slide/template based on decks in that neighbourhood.

Another use case for suggestions is to provide "on the fly" presentation logic. For example, SlideScope could provide an option for a user to, say, skip a particular slide or run of slides. To allow this, the user could input the overall time allotted for the presentation; if SlideScope detects that the user is running over time, it could suggest that the user skips a slide/run. The user could mark this slide/run as a candidate for skipping in advance, or the system could identify runs/slides as candidates for skipping autonomously, for example based on the user's past behaviour (e.g. by learning from which slides the user has skipped in the past during presentations). Similar logic could be used to condense a presentation in advance. For example, the user could nominate a deck and SlideScope can suggest runs/slides the user may want to remove, to create a condensed deck or even suggest slides/runs from other decks that the user may want to add, if he is under time, using the suggestion logic described above. In this context, SlideScope is suggesting slides/runs to add or remove, where the number of suggested slides depends on an allotted time as indicated by the user. Another implementation mechanism would be that the system has learned about corresponding runs of different lengths and, rather than suggesting whole runs to remove, it could offer the shorter or longer versions of the "same" run (see above).

Generally, any of the functions described herein can be implemented using software, firmware, hardware (e.g., fixed logic circuitry), or a combination of these implementations. For example, the components of FIG. 2 generally represent software, firmware, hardware, or a combination thereof capable of performing the described operations. In the case of a software implementation, the module, functionality, or logic represents program code that performs specified tasks when executed on a processor (e.g. CPU or CPUs). The program code can be stored in one or more computer readable memory devices. The features of the techniques described herein are platform-independent, meaning that the techniques may be implemented on a variety of commercial computing platforms having a variety of processors. For example, the system can include an entity (e.g. software) that causes hardware of the system to perform operations, e.g., processors, functional blocks, and so on. For example, the system may include a computer-readable medium that may be configured to maintain instructions that cause the system, and more particularly the operating system and associated hardware of the system to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations. One such configuration of a computer-readable medium is signal bearing medium and thus is configured to transmit the instructions (e.g. as a carrier wave) to a computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of editing a first electronic slide deck by reusing content from a second electronic slide deck, the first and the second electronic slide decks containing first and second sequences of slides respectively, each slide to be presented individually, the method comprising implementing, by a computer system, the following steps:
    identifying a first slide of the second electronic slide deck as matching a first slide of the first electronic slide deck;
    identifying at least a second slide of the second electronic slide deck as a candidate for insertion in the first electronic slide deck by identifying the second slide as having a target positional relationship with the first slide of the first electronic slide deck;
    controlling a user interface to display, to a user, a suggestion to insert the second slide into the first slide deck; and
    in response to the user accepting the suggestion via the user interface, inserting a version of the second slide into the first slide deck, the version of the second slide being inserted at a position in the first sequence that is determined automatically by the computer system based on a position of the first slide in the first sequence such that the first slide in the first sequence and the version of the second slide in the first sequence have a matching positional relationship with respect to the first slide of the second electronic slide deck and second slide of the second electronic slide deck.

2. A method according to claim 1, wherein the computer system identifies a slide in the second sequence as matching the first slide, and identifies the second slide as having the target positional relationship with the first slide by identifying the second slide as being offset from the matching slide in the second sequence by a target amount, wherein the version of the second slide in the first sequence is offset from the first slide in the first sequence by a matching amount.

3. A method according to claim 2, wherein the second slide is the next slide after the matching slide in the second sequence, and the version of the second slide is the next slide after the first slide in the first sequence.

4. A method according to claim 2, wherein the target amount is predetermined.

5. A method according to claim 2, wherein the target amount is variable.

6. A method according to claim 5, wherein the target amount is determined by the computer system based on the second sequence of slides of the second electronic slide deck.

7. A method according to claim 1, wherein the computer system identifies the second slide as having the target positional relationship with the first slide by identifying the second slide in the second sequence as offset from the first slide in the first sequence by a target amount, wherein the version of the second slide in the first sequence is offset from the first slide in the first sequence by a matching amount.

8. A method according to claim 1, wherein the computer system identifies a group of slides in the second sequence as matching a group of slides in the first sequence, wherein that group includes the first slide, wherein the second slide is identified as a candidate for insertion by identifying the second slide as being offset from the matching group in the second sequence by a target amount, wherein the version of the second slide in the first sequence is offset from the group including the first slide by a matching amount.

9. A method according to claim 1, wherein the computer system implements steps of:
    identifying a set of multiple slides, in multiple electronic slide decks, as candidates for insertion in the first electronic slide deck, by identifying those slides as having target positional relationships with the first slide;
    identifying at least one slide of the set of candidate slides as matching a slide that is already present in the first electronic slide deck; and
    filtering-out the at least one matching slide from the set of candidate slides, whereby the at least one matching slide is not suggested for insertion in a first document.

10. A method according to claim 1, wherein the computer system displays the suggestion in response to the user selecting the first slide in the first slide deck via the user interface.

11. A method according to claim 1, wherein the computer system determines a confidence value for the second slide.

12. A method according to claim 11, wherein the computer system identifies multiple slides as candidates for insertion in the first electronic slide deck, determines a confidence value for each of those candidate slides, and displays respective suggestions for those slides wherein the suggestions are ordered according to their determined confidence values.

13. A method according to claim 12, wherein the suggestion displayed for the second slide comprises a display element having a size determined by the computer system as a function of the second slide's determined confidence value.

14. A computer system for editing a first electronic slide deck by reusing content from a second electronic slide deck, the electronic slide decks containing first and second sequences of slides respectively, the computer system comprising:
    computer storage configured to hold executable instructions; and
    at least one processor coupled to the computer storage, the executable instructions being configured when executed on the at least one processor to implement the steps of:
        identifying a first slide of the second electronic slide deck as matching a first slide of the first electronic slide deck;
        identifying at least a second slide of the second electronic slide deck as a candidate for insertion in the first electronic slide deck by identifying the second slide as having a target positional relationship with the first slide of the first electronic slide deck;
        controlling a user interface to display, to a user, a suggestion to insert the second slide into the first slide deck; and
        in response to the user accepting the suggestion via the user interface, inserting a version of the second slide into the first slide deck, the version of the second slide being inserted at a position in the first sequence that is determined automatically by the computer system based on a position of the first slide in the first sequence such that the first slide in the first sequence and the version of the second slide in the first sequence have a matching positional relationship with respect to the first slide of the second electronic slide deck and second slide of the second electronic slide deck.

15. A computer system according to claim 14, wherein the computer system is configured to identify a slide in the second sequence as matching the first slide, and identify the second slide as having the target positional relationship with the first slide by identifying the second slide as being offset from the matching slide in the second sequence by a target amount, wherein the version of the second slide in the first sequence is offset from the first slide in the first sequence by a matching amount.

16. A computer system according to claim 15, wherein the second slide is the next slide after the matching slide in the second sequence, and the version of the second slide is the next slide after the first slide in the first sequence.

17. A computer system according to claim 16, wherein the computer system is configured to identify the second slide as having the target positional relationship with the first slide by identifying the second slide in the second sequence as offset from the first slide in the first sequence by a target amount, wherein the version of the second slide in the first sequence is offset from the first slide in the first sequence by a matching amount.

18. A computer system according to claim 15, wherein the target amount is predetermined.

19. A computer system according to claim 14, wherein the computer system is configured to identify a group of slides in the second sequence as matching a group of slides in the first sequence, wherein that group includes the first slide, wherein the second slide is identified as a candidate for insertion by identifying the second slide as being offset from the matching group in the second sequence by a target amount, wherein the version of the second slide in the first sequence is offset from the group including the first slide by a matching amount.

20. A computer program product for editing a first electronic slide deck by reusing content from a second electronic slide deck, the electronic slide decks containing first and second sequences of slides respectively, the computer program product comprising computer readable instructions stored on a computer readable storage medium and configured when executed to implement the steps of:
 identifying a first slide of the second electronic slide deck as matching a first slide of the first electronic slide deck;
 identifying at least a second slide of the second electronic slide deck as a candidate for insertion in the first electronic slide deck by identifying the second slide as having a target positional relationship with the first slide of the first electronic slide deck;
 controlling a user interface to display, to a user, a suggestion to insert the second slide into the first slide deck; and
 in response to the user accepting the suggestion via the user interface, inserting a version of the second slide into the first slide deck, the version of the second slide being inserted at a position in the first sequence that is determined automatically by the computer program product based on a position of the first slide in the first sequence such that the first slide in the first sequence and the version of the second slide in the first sequence have a matching positional relationship with respect to the first slide of the second electronic slide deck and second slide of the second electronic slide deck.

* * * * *